(12) United States Patent
Lee et al.

(10) Patent No.: US 11,239,937 B2
(45) Date of Patent: Feb. 1, 2022

(54) SEMICONDUCTOR DEVICES

(71) Applicant: Samsung Electronics Co., Ltd., Suwon-si (KR)

(72) Inventors: Tae Hee Lee, Suwon-si (KR); Seung June Kyoung, Suwon-si (KR); Myung Kyoon Yim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/190,853

(22) Filed: Mar. 3, 2021

(65) Prior Publication Data

US 2021/0194619 A1 Jun. 24, 2021

Related U.S. Application Data

(63) Continuation of application No. 16/672,931, filed on Nov. 4, 2019, now Pat. No. 10,951,348.

(30) Foreign Application Priority Data

May 30, 2019 (KR) .................. 10-2019-0063548

(51) Int. Cl.
*G01R 35/00* (2006.01)
*H04L 1/00* (2006.01)
(Continued)

(52) U.S. Cl.
CPC ............ *H04L 1/0003* (2013.01); *H04B 11/00* (2013.01); *H04L 1/0061* (2013.01);
(Continued)

(58) Field of Classification Search
CPC ... H04L 1/0003; H04L 1/0061; H04L 1/0072; H04L 2001/0093; H04B 11/00; G08G 1/166
See application file for complete search history.

(56) References Cited

U.S. PATENT DOCUMENTS

| | | | |
|---|---|---|---|
| 3,876,940 A | 4/1975 | Wickord et al. | |
| 6,373,307 B1 * | 4/2002 | Takai | H03L 7/00 327/161 |

(Continued)

FOREIGN PATENT DOCUMENTS

| | | |
|---|---|---|
| JP | 2011-143775 A | 7/2011 |
| KR | 10-1070225 B1 | 10/2011 |

(Continued)

*Primary Examiner* — Munear T Akki
(74) *Attorney, Agent, or Firm* — Harness, Dickey & Pierce, P.L.C.

(57) ABSTRACT

A semiconductor device includes a first processor configured to generate a first error check code of a first data and an audio circuitry. The audio circuitry is configured to receive the first data, receive a second data, generate a second error check code of the first data, and generate a modulation signal based on the first and second data. The first processor may determine whether the first and second error check codes are identical to each other. The first processor may control the audio circuitry to control the generation of the modulation signal based on at least the first data, in response to a determination that the first and second error check codes are identical to each other.

20 Claims, 13 Drawing Sheets

(51) Int. Cl.
  *H04B 11/00* (2006.01)
  *G08G 1/16* (2006.01)
(52) U.S. Cl.
  CPC ........... *H04L 1/0072* (2013.01); *G08G 1/166* (2013.01); *H04L 2001/0093* (2013.01)

(56) References Cited

U.S. PATENT DOCUMENTS

| | | | | |
|---|---|---|---|---|
| 9,194,884 | B1* | 11/2015 | Mossman | G01R 31/50 |
| 2003/0070126 | A1* | 4/2003 | Werner | G11C 11/56 |
| | | | | 714/715 |
| 2006/0195720 | A1* | 8/2006 | Watts | H03F 3/217 |
| | | | | 714/11 |
| 2013/0249544 | A1* | 9/2013 | Vig | G01R 33/0047 |
| | | | | 324/252 |
| 2014/0184200 | A1* | 7/2014 | Milano | G01R 33/072 |
| | | | | 324/202 |
| 2015/0185279 | A1* | 7/2015 | Milano | G01R 31/2829 |
| | | | | 324/750.3 |

FOREIGN PATENT DOCUMENTS

| | | |
|---|---|---|
| KR | 10-1073588 B1 | 10/2011 |
| KR | 10-1111547 B1 | 2/2012 |
| KR | 20120022279 A | 3/2012 |
| KR | 10-1723749 B1 | 4/2017 |
| KR | 20180062672 A | 6/2018 |

\* cited by examiner

SEMICONDUCTOR DEVICES

CROSS-REFERENCE TO RELATED APPLICATIONS

This application is a continuation of U.S. application Ser. No. 16/672,931, filed Nov. 4, 2019, which claims the benefit, under 35 U.S.C. § 119, of Korean Patent Application No. 10-2019-0063548, filed on May 30, 2019, in the Korean Intellectual Property Office, the disclosure of each of which is incorporated herein in its entirety by reference.

BACKGROUND

1. Technical Field

The present inventive concepts relate to semiconductor devices, and more particularly, to semiconductor devices that detect one or more errors in one or more warning signals generated in one or more specific situations.

2. Description of the Related Art

A case of collision with surrounding vehicles due to carelessness of a driver or poor visibility often happens at the time of operation (e.g., driving) of a vehicle. Traffic accidents due to a lane departure of the vehicle and/or a collision of the vehicle with one or more other traveling vehicles caused by poor visibility, lack of concentration of a driver of the vehicle or the like at the time of long-distance driving, rainy weather and nighttime driving may constantly occur. An advanced driver assistance system (ADAS) is a system that executes collision warning, collision avoidance, and cruise control with regard to at least one vehicle to reduce or prevent traffic accidents involving the vehicle. An advanced driver assistance system included in a vehicle may provide driving information or a danger warning to a driver of the vehicle and/or intervene in the driving (e.g., driving control of) the vehicle to reduce or prevent a safety accident involving the vehicle (e.g., a collision of the vehicle with an external object in the surrounding environment) so that the one or more occupants of the vehicle, including a driver of the vehicle, may travel in the vehicle more conveniently and safely. As the advanced driver assistance system, a lane departure prevention system, an intelligent cruise control system and the like which perform active steering and speed control in an assistance information generation system such as a rear parking warning system, a lane departure warning system, and a drowsy driving warning system are being studied.

SUMMARY

According to some example embodiments of the present inventive concepts, a semiconductor device may include a first processor configured to generate a first error check code of a first data, and an audio circuitry. The audio circuitry may be configured to receive the first data, receive a second data, generate a second error check code of the first data, and generate a first modulation signal, based on the first and second data. The first processor may be configured to determine whether the first and second error check codes are identical to each other, and control the generation of the first modulation signal based on at least the first data in response to a determination that the first and second error check codes are identical to each other.

According to some example embodiments of the present inventive concepts, a semiconductor device may include an audio circuitry configured to receive a warning signal and an audio signal, modulate at least one of an amplitude or a frequency of the warning signal and the audio signal to generate a modulated warning signal and a modulated audio signal, and output the modulated warning signal and the modulated audio signal to a pad to cause the pad to output an output warning signal. The semiconductor device may include a control circuitry configured to control an operation of the audio circuitry, wherein the audio circuitry is configured to transmit a comparison result signal to the control circuitry based on comparing the modulated warning signal with the output warning signal.

According to some example embodiments of the present inventive concepts, a semiconductor device may include a central processing circuitry configured to control an input and an output of an audio signal, a warning signal control circuitry configured to generate a warning signal and generate a first CRC code of the warning signal, and an output signal generation circuitry configured to generate an output signal to be output to an external device, based on the audio signal and the warning signal. The output signal generation circuitry may be configured to receive the warning signal, generate a second CRC code of the warning signal, and transmit the second CRC code to the warning signal control circuitry. The warning signal control circuitry may be configured to control the output signal generation circuitry to generate the output signal in response to a determination that the first CRC code and the second CRC code are identical to each other.

Some example embodiments of the present inventive concepts are not restricted to the example embodiments expressly set forth herein. The above and other aspects of the present inventive concepts will become more apparent to one of ordinary skill in the art to which the present inventive concepts pertain by referencing the detailed description of the present inventive concepts given below.

BRIEF DESCRIPTION OF THE DRAWINGS

The above and other aspects and features of the present inventive concepts will become more apparent by describing in detail example embodiments thereof with reference to the attached drawings, in which.

DETAILED DESCRIPTION

A case of collision with surrounding vehicles due to carelessness of a driver or poor visibility often happens at the time of operation of a vehicle. Traffic accidents due to a lane departure or a collision with traveling vehicle caused by poor visibility, lack of concentration of a driver or the like at the time of long-distance driving, rainy weather and nighttime driving constantly occur. An advanced driver assistance system (ADAS) is a system that executes collision warning, collision avoidance, and cruise control to reduce or prevent traffic accidents. The advanced driver assistance system may provide driving information or danger warning or intervene in the vehicle driving to reduce or prevent a safety accident so that the driver may travel more conveniently and safely. As the advanced driver assistance system, a lane departure reduce or prevention system, an intelligent cruise control system and the like which perform active steering and speed control in an assistance information generation system such as a rear parking warning system, a lane departure warning system, and a drowsy driving warning system are being studied.

For example, a method of transmitting the warning to the driver by generating and outputting an audio warning signal in a specific situation (for example, a human body detection, a proximity vehicle detection, a drowsiness detection, and the like) is used. If an error occurs in the warning signal under the influence of the internal or external environment, the warning signal may not be generated or the sound volume may not be adjusted. In such a case, a dangerous situation such as a vehicle accident may occur.

Hereinafter, a semiconductor device according to some example embodiments of the present inventive concepts designed as a solution to the above problems will be described referring to FIGS. 1 to 17.

Figure 1:
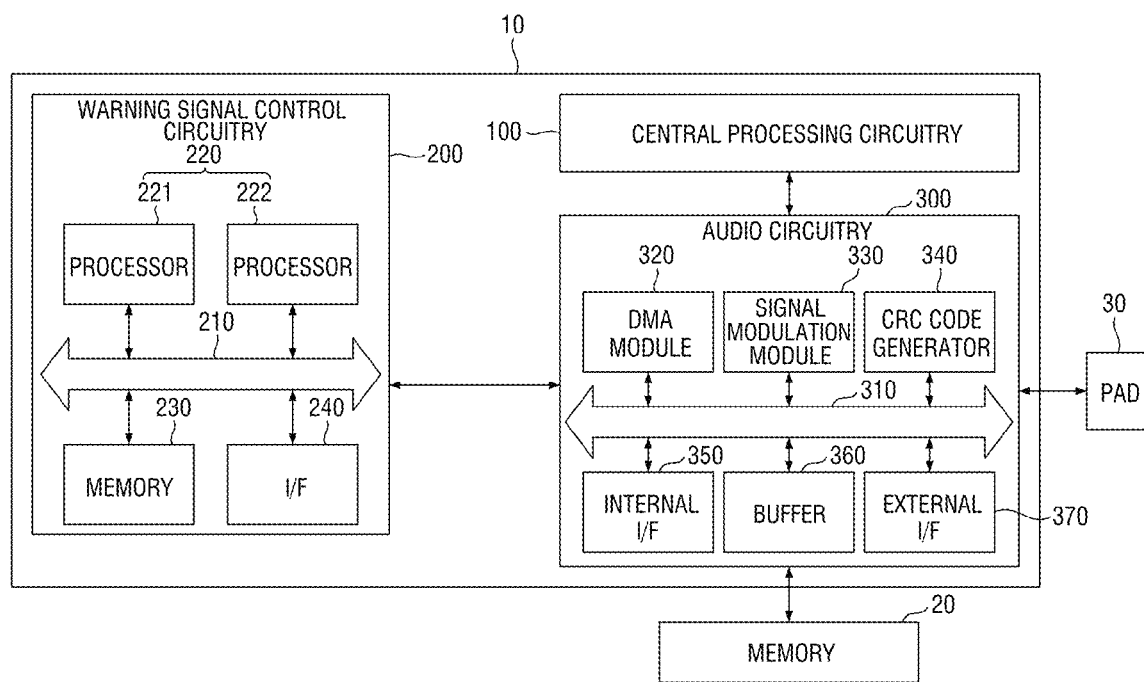
FIG. 1 is a block diagram for explaining a semiconductor device according to some example embodiments of the present inventive concepts.

FIG. 1 is a block diagram for explaining a semiconductor device according to some example embodiments of the present inventive concepts.

Referring to FIG. 1, a semiconductor device 10 according to some example embodiments of the present inventive concepts may include a central processing circuitry 100, a warning signal control circuitry 200, and an audio circuitry 300.

As shown in FIG. 1, each of the central processing circuitry 100, warning signal control circuitry 200, and audio circuitry 300 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., memory 20), for example a solid state drive (SSD), storing a program of instructions, and a processor configured to execute the program of instructions to implement the functionality of any one or more of the central processing circuitry 100, warning signal control circuitry 200, or audio circuitry 300.

The central processing circuitry 100 may control the overall operation of the semiconductor device 10. For example, the central processing circuitry 100, which may include and/or may be implemented by one or more instances of processing circuitry, may generally control the semiconductor device 10 by executing programs (also referred to herein as one or more programs of instructions) stored in a memory 20. In addition, the central processing circuitry 100 may perform functions of the semiconductor devices 10, 11, 12, 13, 14 and 15 described in FIGS. 1 to 17, by executing one or more programs stored in the memory 20. The central processing circuitry 100 may be equipped with at least one processor. The central processing circuitry 100 may include a plurality of processors or one processor of an integrated form, depending on its function and role.

The warning signal control circuitry 200 may include a bus 210, a processor 220, a memory 230 and an interface 240. The processor 220 may include a first processor 221 and a second processor 222.

The bus 210 may provide a communication channel between the constituent elements of the warning signal control circuitry 200. That is, exchange of signals or data between the constituent elements of the warning signal control circuitry 200 such as the first processor 221, the second processor 222, the memory 230 and the interface 240 may be performed through a bus 210.

The first processor 221 and the second processor 222 may control the overall operations of the warning signal control circuitry 200 and perform logical operations. According to some example embodiments, the first processor 221 and the second processor 222 may control at least some operations performed by the audio circuitry 300. For example, it is possible to control an operation in which a warning signal SIG_WRN is output through the pad 30, which will be described later.

According to some example embodiments, the first processor 221 and the second processor 222 may perform a same operation. For example, the first processor 221 and the second processor 222 may generate a cycle redundancy check (CRC) code, also referred to herein as an "error check code," of the warning signal SIG_WRN. For example, it will be understood that the first processor 221 may generate a first error check code (e.g., CRC code) of a first data (e.g., the warning signal SIG_WRN). That is, the CRC code of the same warning signal may be generated, and errors that may be generated in the process of generation of the CRC code may be reduced or prevented based on comparing the CRC codes generated by each of the first processor 221 and the second processor 222. According to some example embodiments, the first processor 221 and the second processor 222 may use a data recognition model based on a neural network such as a deep neural network (DNN) and a recurrent neural network (RNN).

In some example embodiments, the first processor 221 and/or the second processor 222 may perform some operations by artificial intelligence and/or machine learning, including deep learning. As an example, the first processor 221 and/or the second processor 222 may include an artificial neural network that is trained on a set of training data by, for example, a supervised, unsupervised, and/or reinforcement learning model, and wherein the first processor 221 and/or the second processor 222 may process a feature vector to provide output based upon the training. Such artificial neural networks may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), and/or restricted Boltzmann machines (RBM). Alternatively or additionally, the first processor 221 and/or the second processor 222 may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests and generative adversarial networks (GANs).

The memory 230 may store data required for the overall operations of the first processor 221 and the second processor 222. According to some example embodiments, the memory 230 may store data required for the first processor 221 and the second processor 222 to generate a CRC code of the warning signal. According to some example embodiments, the memory 230 may be a non-transitory computer readable storage device. According to some example embodiments, the memory 230 may include non-volatile memory. However, the scope of the present inventive concepts is not limited thereto, and the memory 230 may include at least one of volatile or non-volatile memories such as a static RAM (SRAM), a dynamic RAM (DRAM), a synchronous DRAM (SDRAM), a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

The interface 240, which may be referred to as a communication interface, may communicate with the internal configurations of the semiconductor device 10. For example, interface 240 may be an interface for executing data transmission and reception between the central processing circuitry 100 and the audio circuitry 300 of the semiconductor device 10. Although it is not illustrated, according to some example embodiments, an interface for performing data communication with the outside (e.g., one or more devices external to the semiconductor device 10) may be further included. Therefore, data (for example, a warning signal) may be received from the outside or data may be transmitted to the outside.

The audio circuitry 300 may include a bus 310, a DMA module 320, a signal modulation module 330, a CRC code generator 340, an internal interface 350, a buffer 360 and an external interface 370. In the present specification, the audio circuitry 300 may also be named as an "output signal generation circuitry". It will be understood that some or all of the elements of the audio circuitry 300 may be implemented by one or more instances of processing circuitry, including one or more processors, executing one or more programs of instructions stored in a memory. For example, the DMA module 320, the signal modulation module 330, and the CRC code generator 340 may be implemented by processing circuitry of the audio circuitry 300 that executes a program of instruction stored on a memory (e.g., memory 20). Accordingly, it will be understood that the audio circuitry 300 may perform some or all of the functions of the elements of the audio circuitry 300 that are described herein, for example based on one or more instances of processing circuitry of the audio circuitry 300 executing one or more programs of instructions stored on a memory.

The bus 310 may provide a channel between constituent elements of the audio circuitry 300. In other words, exchange of signals or data between constituent elements such as the DMA module 320, the signal modulation module 330, the CRC code generator 340, the internal interface 350, the buffer 360 and the external interface 370 may be performed through the bus 310.

The DMA module 320 may store the data received from the warning signal control circuitry 200 or the memory 20 and may transfer the data to the signal modulation module 330 or the CRC code generator 340. The DMA module 320 may be included in and/or may be implemented by one or more instances of processing circuitry. The DMA module 320 may include and/or may implement a first DMA engine 321 and a second DMA engine 322.

The signal modulation module 330 may modulate a signal received from the DMA module 320 and may output (e.g., generate, transmit, etc.) a modulation signal. According to some example embodiments, the amplitude of the signal received from the DMA module 320 may be modulated and output. According to some example embodiments, the frequency of the signal received from the DMA module 320 may be modulated and output. If the signal received from the DMA module 320 is an audio signal, the amplitude or frequency of the signal may be modulated to adjust the sound volume of the received signal. For example, when the warning signal SIG_WRN is received from the warning signal control circuitry 200, modulation for reducing the sound volume of the audio signal SIG_AD may be performed.

The CRC code generator 340 may generate a CRC code corresponding to the data to identify errors that may occur in the transfer process of the data. That is, the CRC code may be a code for detecting an error in data. For example, the CRC code of the warning signal SIG_WRN received from the warning signal control circuitry 200 or the signal modulated by the signal modulation module 330 may be generated.

The internal interface 350, which may be a communication interface, may communicate with the internal configurations of the semiconductor device 10. For example, the internal interface 350 may be an interface for executing data transmission and reception between the central processing circuitry 100 and the warning signal control circuitry 200 of the semiconductor device 10.

The buffer 360 may temporarily store data to be transmitted. For example, the buffer 360 may temporarily store the modulated data that is output from the signal modulation module 330, and the temporarily stored data may be transferred to the pad 30 through the external interface 370.

The external interface 370, which may be a communication interface, may operate to perform data transmission and reception with the outside (e.g., devices external to the semiconductor device 10). According to some example embodiments, data may be converted by converting output data into a protocol corresponding to an external device with which it communicates. The external interface 370 may be connected to the pad 30 to perform data transmission and reception with the outside.

The memory 20 may be mounted on (e.g., included in) a vehicle. In such a case, the memory 20 may store various data necessary for the operation of the vehicle. According to some example embodiments, the memory may store data regarding media content (e.g., music data), map data, and data regarding vehicle safety (e.g., sensor data). The memory 20 may include non-volatile memory for storing data. For example, the memory 20 may include a plurality of flash memories. In FIG. 1, the memory 20 is shown as being located outside the semiconductor device 10 but is not limited thereto. That is, according to some example embodiments, the memory 20 may be disposed inside the semiconductor device 10.

According to some example embodiments, the memory 20 may include non-volatile memory. However, the scope of the present inventive concepts is not limited thereto, and the memory 20 may include at least one of volatile or non-volatile memories such as a Static RAM (SRAM), a Dynamic RAM (DRAM), a Synchronous DRAM (SDRAM), a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), and a Ferroelectric RAM (FRAM).

The pad 30 may be connected to the external interface 370 to communicate with the outside. The pad 30 may be a Passive Attenuator Device or Attenuator as the term is well known in the field of audio systems. According to some example embodiments, an audio signal stored in the memory 20 may be transferred to an external audio output device (e.g., a driver, speaker, or the like) via the pad 30. According to some example embodiments, the warning signal that is output from the warning signal control circuitry 200 may be transferred to an external audio output device, to be emitted as an audio signal, through the pad 30.

Figure 2:
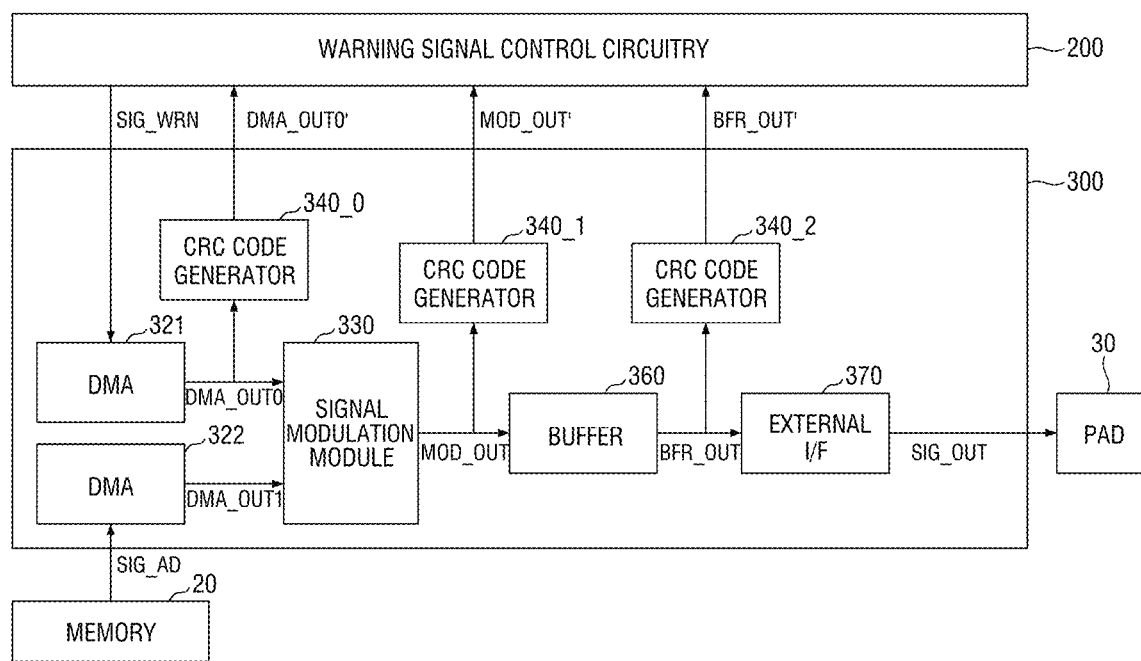
FIG. 2 is a block diagram for explaining the semiconductor device including a code generator according to some example embodiments of the present inventive concepts.

FIG. 2 is a block diagram for explaining a semiconductor device including a code generator according to some example embodiments of the present inventive concepts. It will be understood that some or all of the elements, modules, circuitry, and the like shown in the audio circuitry 300 of FIG. 2 may be included in and/or implemented by one or more instances of processing circuitry of the audio circuitry 300, including one or more processors executing one or more programs of instructions stored in one or more memories, such that the audio circuitry 300 will be understood to perform some or all of the functionality of the elements of the audio circuitry 300 as described herein. Hereinafter, a process of outputting a warning signal SIG_WRN and an audio signal SIG_AD according to some example embodiments of the present inventive concepts will be described referring to FIG. 2.

According to some example embodiments, the audio circuitry 300 may receive a warning signal SIG_WRN from the warning signal control circuitry 200. Specifically, the first DMA engine 321 of the audio circuitry 300 receives the warning signal SIG_WRN that is output from the warning signal control circuitry 200 and may output (e.g., generate) the first DMA output signal on the basis thereof. In some example embodiments, the warning signal SIG_WRN may be referred to herein as "first data," such that it will be understood that the first DMA engine 321 may receive the first data, and that the first DMA output signal DMA_OUT0 may include the first data. The first DMA output signal DMA_OUT0 may be transmitted to the signal modulation module 330. According to some example embodiments, the warning signal SIG_WRN and the first DMA output signal DMA_OUT0 may be the same signal.

The second DMA engine 322 may receive the audio signal SIG_AD from the memory 20 and may output a second DMA output signal DMA_OUT1 on the basis of the audio signal SIG_AD. In some example embodiments, the audio signal SIG_AD may be referred to herein as "second data," such that it will be understood that the second DMA engine 322 may receive the second data and the second DMA output signal DMA_OUT1 may include the second data. The second DMA output signal DMA_OUT1 may be transmitted to the signal modulation module 330. The audio signal SIG_AD may be, for example, audio data such as music data, navigation audio data, and DMB audio data. According to some example embodiments, the audio signal SIG_AD and the second DMA output signal DMA_OUT1 may be the same signal.

According to some example embodiments, the audio signal SIG_AD is read from the memory 20 to the second DMA engine 322 under control of the central processing circuitry 100 and may be transmitted to the signal modulation module 330. That is, transmission of the warning signal SIG_WRN may be controlled by the warning signal control circuitry 200, for example, the first processor 221 and/or the second processor 222, and transmission of the audio signal SIG_AD may be controlled by the central processing circuitry 100. In some example embodiments, the first processor 221, second processor 222, and/or central processing circuitry 100 may cause the audio signal SIG_AD (e.g., second data) that is stored in the memory 20 to be transmitted to the second DMA engine 322. In some example embodiments, the first processor 221, second processor 222, and/or central processing circuitry 100 may be mounted on a same semiconductor chip as the memory 20.

The first DMA output signal DMA_OUT0 that is output from the first DMA engine 321 may be transmitted to the first CRC code generator 340_0, which is also referred to herein as a "first code generator." That is, the first DMA output signal DMA_OUT0 may be transmitted to the signal modulation module 330 and the first CRC code generator 340_0. According to some example embodiments, the first DMA output signal DMA_OUT0 is preferentially transmitted to the first CRC code generator 340_0, and whether it is transmitted to the signal modulation module 330 (e.g., whether a modulation signal MOD_OUT is generated based on the first data) may be determined in accordance with the control of the warning signal control circuitry 200 later.

The first CRC code generator 340_0 may generate a CRC code of the first DMA output signal DMA_OUT0. The CRC code may be a code for detecting an error of data (e.g., the first DMA output signal DMA_OUT0). Also, the CRC code may be generated in a preset arbitrary bit or a preset arbitrary pattern.

The first CRC code generator 340_0 may add the generated CRC code to the first DMA output signal DMA_OUT0 to output a first DMA error check signal DMA_OUT0'. The first DMA error check signal DMA_OUT0' that is output by the first CRC code generator 340_0 may be transmitted to the warning signal control circuitry 200. Accordingly, it will be understood that the audio circuitry 300 may generate a CRC code associated with the warning signal SIG_WRN and transmit the generated CRC code to the warning signal control circuitry 200.

As the first DMA output signal DMA_OUT0 is generated by the first DMA engine 321 based on the "first data" that is the warning signal SIG_WRN, and as the first processor 221 of the warning signal control circuitry 200 may generate a first error check code of the first data, it will be understood that the first CRC code generator 340_0 may be a first code generator that generates a CRC code, referred to as a first DMA error check signal DMA_OUT0', that is a second error check code of the first data.

The warning signal control circuitry 200 may determine whether there is an error in the first DMA output signal DMA_OUT0. According to some example embodiments, the first processor 221 and the second processor 222 of the warning signal control circuitry 200 may determine whether there is an error in the first DMA output signal DMA_OUT0. For example, the CRC code (e.g., first error check code) generated in advance (e.g., by the first processor 221) may be compared with the CRC code of the first DMA error check signal DMA_OUT0' (e.g., the second error check code) to determine whether there is an error in the first DMA output signal DMA_OUT0. At this time, the CRC code generated in advance is stored in the memory 230, and the first processor 221 and the second processor 222 may perform the comparison operation of the CRC code, using the CRC code stored in the memory 230. Such comparison, which may be performed by the first processor 221, for example, may include determining whether the first and second error check codes are identical to each other.

As a result of determining whether there is an error in the first DMA output signal DMA_OUT0 performed in the first processor 221 and the second processor 222, if the CRC code of the first DMA error check signal DMA_OUT0' and the CRC code generated in advance are identical, the warning signal control circuitry 200 may give (e.g., generate, transmit, etc.) a command to cause the output of the signal modulation module 330 (e.g., MOD_OUT) to be transmitted to the buffer 360.

According to some example embodiments, if the CRC code of the first DMA error check signal DMA_OUT0' and the CRC code generated in advance are identical, the warning signal control circuitry 200 may control the audio circuitry 300 to perform the signal modulation operation in the signal modulation module 330 (e.g., control the first DMA engine 321 to cause the first data, warning signal SIG_WRN, to be transmitted to the signal modulation module 330, for example as part of the first DMA output signal DMA_OUT0).

According to some example embodiments, if the CRC code of the first DMA error check signal DMA_OUT0' and the CRC code generated in advance are identical, the warning signal control circuitry 200 may give a command (e.g., to the first DMA engine 321) to cause the first DMA output signal DMA_OUT0 to be transmitted to the signal modulation module 330 (e.g., the command causes the first DMA engine 321 to cause the first DMA output signal DMA_OUT0, which may include the warning signal SIG_WRN, to be transmitted to the signal modulation module 330).

As a result of determining whether there is an error in the first DMA output signal DMA_OUT0 performed in the first processor 221 and the second processor 222, if the CRC code of the first DMA error check signal DMA_OUT0' and the CRC code generated in advance are different from each other, the warning signal control circuitry 200 may give (e.g., generate, transmit, output, etc.) a command to cause the output of the signal modulation module 330 to not be transmitted to the buffer 360.

According to some example embodiments, if the CRC code of the first DMA error check signal DMA_OUT0' and the CRC code generated in advance are different from each other, the warning signal control circuitry 200 may control the audio circuitry 300 to not to execute the signal modulation operation in the signal modulation module 330.

According to some example embodiments, if the CRC code of the first DMA error check signal DMA_OUT0' and the CRC code generated in advance are different from each other, the warning signal control circuitry 200 may give a command to cause the first DMA output signal DMA_OUT0 to not be transmitted to the signal modulation module 330.

According to some example embodiments, if the determination result of the first processor 221 and the determination result of the second processor 222 are different from each other, it is possible to determine whether there is an error in the first DMA output signal DMA_OUT0 again. For example, as the determination result of the first processor 221, if the CRC code of the first DMA error check signal DMA_OUT0' and the CRC code generated in advance are the identical, but the determination result of the second processor 222 is different, the command to the audio circuitry 300 is held, and it is possible to determine whether there is an error in the first DMA output signal DMA_OUT0 again.

The signal modulation module 330 may receive the first DMA output signal DMA_OUT0 and the second DMA output signal DMA_OUT1 that are each output from the first DMA engine 321 and the second DMA engine 322 and may perform the modulation operation on the received signals. The first DMA output signal DMA_OUT0 and the second DMA output signal DMA_OUT1 may include the warning signal SIG_WRN ("first data") and the audio signal SIG_AD ("second data"), respectively, such that it will be understood that the signal modulation module 330 may receive the first and second data. According to some example embodiments, the signal modulation module 330 may perform the frequency modulation or the amplitude modulation of the received signal. The output sound volume of the audio signal may be adjusted through the frequency or amplitude modulation. Accordingly it will be understood that the signal modulation module 330, and thus the audio circuitry 300, may modulate at least one of an amplitude or a frequency of the warning signal and the audio signal to generate a modulated warning signal and a modulated audio signal. For example, the modulation operation of the signal may be performed so that, when the warning signal SIG_WRN is output (e.g., by an external audio device), the sound volume of the warning sound corresponding to the warning signal SIG_WRN is relatively large, and the sound volume of audio corresponding to the audio signal SIG_AD is relatively small or is not output. The signal modulation module 330 may output (e.g., generate) a modulation output signal MOD_OUT ("first modulation signal") obtained by modulating the first DMA output signal DMA_OUT0 and the second DMA output signal DMA_OUT1. It will thus be understood that the signal modulation module 330 may output a first modulation signal (MOD_OUT) based on the first and second data (SIG_WRN and SIG_AD). According to some example embodiments, as illustrated, the modulation signal of the first DMA output signal DMA_OUT0 and the modulation signal of the second DMA output signal DMA_OUT1 may be combined and output as one signal, such that a modulated warning signal and a modulated audio signal are output as a single first modulation signal (MOD_OUT). According to some example embodiments, the modulation signal of the first DMA output signal DMA_OUT0 and the modulation signal of the second DMA output signal DMA_OUT1 may be output as separate signals, respectively.

The modulation output signal MOD_OUT that is output from the signal modulation module 330 may be temporarily stored in the buffer 360. That is, the modulation output signal MOD_OUT may be buffered. The buffer 360 may output the buffer output signal BFR_OUT to the external interface 370 after temporarily storing the modulation output signal MOD_OUT. That is, it is possible to perform a buffering operation for transmitting the data from the signal modulation module 330 having a relatively high data rate or bit rate to an external interface 370 having a relatively low data rate or bit rate. The modulation output signal MOD_OUT and the buffer output signal BFR_OUT may be the same signal.

The second CRC code generator 340_1, which may be referred to herein as a second code generator circuitry, may receive the modulation output signal MOD_OUT (e.g., first modulation signal). That is, the modulation output signal MOD_OUT may be transmitted to the buffer 360 and the second CRC code generator 340_1. The second CRC code generator 340_1 may generate a CRC code of (e.g., associated with) the modulation output signal MOD_OUT.

The second CRC code generator 340_1 may generate a CRC code of the modulation output signal MOD_OUT. Such a CRC code may be referred to as a third error chick code of the first modulation signal. The CRC code may be a code for detecting an error in data (e.g., buffer output signal BFR_OUT). Also, the CRC code may be generated in a preset arbitrary bit or a preset arbitrary pattern.

The second CRC code generator 340_1 may add the generated CRC code to the modulation output signal MOD_OUT to output a first buffer error check signal MOD_OUT'. The first buffer error check signal MOD_OUT' that is output by the second CRC code generator 340_1 may be transmitted to the warning signal control circuitry 200.

According to some example embodiments, if the modulation signal of the warning signal SIG_WRN and the modulation signal of the audio signal SIG_AD are output from the signal modulation module 330, respectively, the second CRC code generator 340_1 may generate a CRC code of the modulation signal of the warning signal SIG_WRN.

The third CRC code generator 340_2, which may be referred to herein as a third code generator, may receive a buffer output signal BFR_OUT. That is, the buffer output signal BFR_OUT may be transmitted to the external interface 370 and the third CRC code generator 340_2. The third CRC code generator 340_2 may generate a CRC code of the buffer output signal BFR_OUT.

The third CRC code generator 340_2 may generate a CRC code of the buffer output signal BFR_OUT that is output from the buffer 360. Such a CRC code may be referred to as a fourth error check code of the buffer output signal BFR_OUT. The CRC code may be a code for detecting an error in data (e.g., the buffer output signal BFR_OUT). Also, the CRC code may be generated in a preset arbitrary bit or a preset arbitrary pattern.

The third CRC code generator 340_2 may add the generated CRC code to the buffer output signal BFR_OUT to output a second buffer error check signal BFR_OUT'. The second buffer error check signal BFR_OUT' that is output by the third CRC code generator 340_2 may be transmitted to the warning signal control circuitry 200. Accordingly, it will be understood that the audio circuitry 300 may buffer the modulated warning signal and modulated audio signal, generate CRC codes of an input signal of the buffer 360 (e.g., MOD_OUT) and an output signal of the buffer (e.g., BFR_OUT), respectively, and transmit the CRC codes to the warning signal control circuitry 200.

According to some example embodiments, if the buffer signal of the warning signal SIG_WRN and the buffer signal of the audio signal SIG_AD are output from the respective buffers 360, the third CRC code generator 340_2 may generate a CRC code of a buffer signal corresponding to the warning signal SIG_WRN.

The warning signal control circuitry 200 may determine whether there is an error in the buffer output signal BFR_OUT. According to some example embodiments, the first processor 221 and the second processor 222 of the warning signal control circuitry 200 may determine whether there is an error in the buffer output signal BFR_OUT. Each of the first processor 221 and the second processor may compare the CRC codes of the first buffer error check signal MOD_OUT' and the second buffer error check signal BFR_OUT' to determine whether there is an error in the buffer output signal BFR_OUT.

If the CRC code of the first buffer error check signal MOD_OUT' (e.g., the third error check code) and the CRC code of the second buffer error check signal BFR_OUT' (e.g., the fourth error check code) are identical to each other as result of the determination as to whether there is an error in the buffer output signal BFR_OUT performed by the first processor 221 and the second processor 222, the warning signal control circuitry 200 may give a command so that the output of the buffer 360 is transmitted to the external interface 370.

According to some example embodiments, if the CRC code of the first buffer error check signal MOD_OUT' and the CRC code of the second buffer error check signal BFR_OUT' are identical, the warning signal control circuitry 200 may control the audio circuitry 300 to perform a protocol generation or conversion operation in the external interface 370. Accordingly, it will be understood that at least the first processor 221 and/or the second processor 222 may control the external interface 370 to cause the external interface 370 to output the external output signal SIG_OUT only in response to a determination that the third and fourth error check codes (e.g., as indicated by MOD_OUT' and BFR_OUT', respectively) are identical to each other. Restated, the warning signal control circuitry 200 may control the audio circuitry 300 to cause the audio circuitry 300 to output the output signal of the buffer (BFR_OUT) to the pad 30 (e.g., as SIG_OUT) in response to a determination that the CRC code of the input signal of the buffer 360 (MOD_OUT) is identical to the CRC code of the output signal of the buffer 360 (BFR_OUT).

If the CRC code of the first buffer error check signal MOD_OUT' is different from the CRC code of the second buffer error check signal BFR_OUT' as a result of the determination as to whether there is an error in the buffer output signal BFR_OUT performed in the first processor 221 and the second processor 222, the warning signal control circuitry 200 may give a command to cause the output of the buffer 360 to be not transmitted to the external interface 370.

According to some example embodiments, when the CRC code of the first buffer error check signal MOD_OUT' is different from the CRC code of the second buffer error check signal BFR_OUT', the warning signal control circuitry 200 may cause the audio circuitry 300 to not perform a protocol generation or conversion operation in the external interface 370.

The external interface 370, which may be referred to as a first interface, may receive the buffer output signal BFR_OUT, perform a generation or conversion operation of protocol to correspond to an external device with which it communicates, and output the external output signal SIG_OUT. Accordingly, it will be understood that the external interface 370 may generate the external output signal SIG_OUT, which may be referred to as a first output signal, based on the buffer output signal BFR_OUT.

The external output signal SIG_OUT that is output by the external interface 370 may be transmitted to the pad 30 and may be output to the outside (e.g., an external device coupled to the pad 30) through the pad 30. Accordingly, it will be understood that the external interface 370, and thus the audio circuitry 300, may output the modulated warning signal and audio signal, which is modulated by the signal modulation module 330, to the pad 30. Additionally, it will be understood that the pad 30 may receive the external output signal (SIG_OUT) and may be connected to an external device that is external to the semiconductor device 10 (e.g., an external audio output device) and thus is configured to output the external output signal to the external device.

According to some example embodiments of the present inventive concepts, it is possible to determine whether there is an error in the first DMA output signal DMA_OUT0 which is the output of the first DMA engine 321, by the first CRC code generator 340_0. Thus, it is possible to determine whether there is an error in the warning signal SIG_WRN. In the case of a warning signal SIG_WRN which is output in an emergency during operation of the vehicle, if an error occurs in the transmission process of signal, it may not be transmitted as intended, which may lead to a dangerous situation. Therefore, it is possible to determine whether there is an error in the warning signal SIG_WRN before being output to an external device (for example, an acoustic output device such as an amplifier or a speaker). Also, by generating the CRC signals for the input and output signals of the buffer 360 and comparing and determining them, the semiconductor device 10 may be configured to reduce or prevent an occurrence of error that may occur in the buffering process of the buffer 360.

Figure 3:
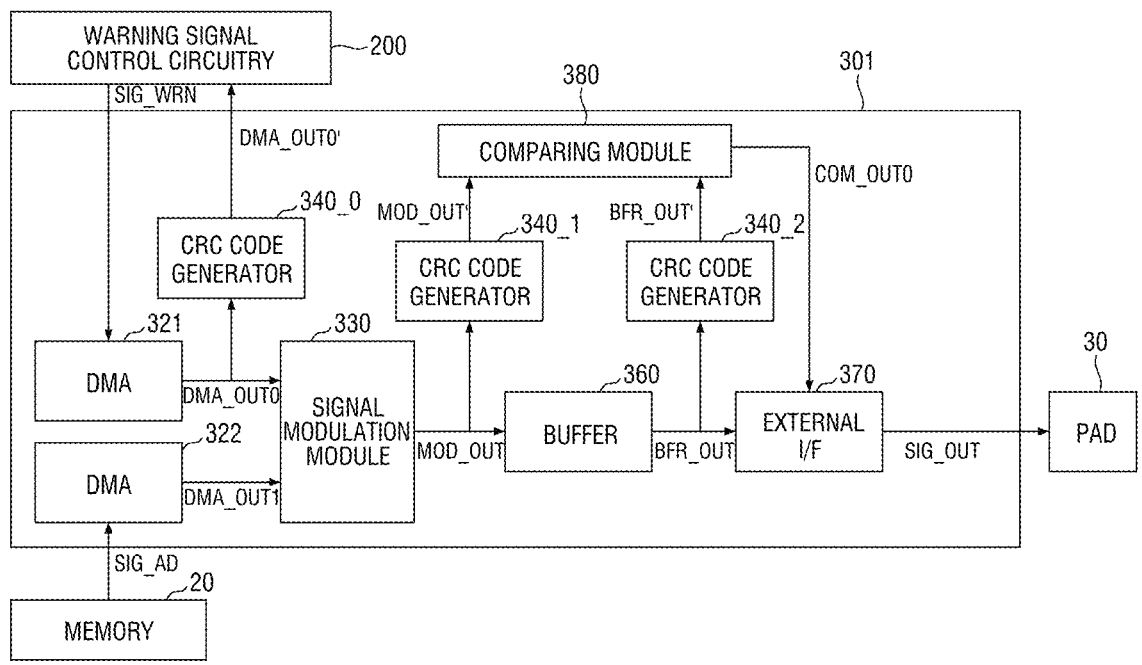
FIG. 3 is a block diagram for explaining the semiconductor device including a comparing module for comparing error check codes according to some example embodiments of the present inventive concepts.

FIG. 3 is a block diagram for explaining a semiconductor device including a comparing module for comparing error check codes according to some example embodiments of the present inventive concepts. It will be understood that some or all of the elements, modules, circuitry, and the like shown in the audio circuitry 301 of FIG. 3 may be included in and/or implemented by one or more instances of processing circuitry of the audio circuitry 301, including one or more processors executing one or more programs of instructions stored in one or more memories, such that the audio circuitry 301 will be understood to perform some or all of the functionality of the elements of the audio circuitry 300 as described herein. Hereinafter, the description of the repeated parts of the above contents described referring to FIGS. 1 and 2 will not be provided.

Referring to FIG. 3, an audio circuitry 301 of the semiconductor device 10, which may, in some example embodiments, replace the audio circuitry 300 in the semiconductor device 10 of FIG. 1, according to some example embodiments of the present inventive concepts may further include a first comparing module 380. The first comparing module 380 may receive a first buffer error check signal MOD_OUT' generated from the second CRC code generator 340_1 and a second buffer error check signal BFR_OUT' generated from the third CRC code generator 340_2 and may perform a comparison operation of the received signals. That is, the first buffer error check signal MOD_OUT' and the second buffer error check signal BFR_OUT' are not transmitted to the warning signal control circuitry 200 (e.g., first processor 221), but are transmitted to the first comparing module 380 in the audio circuitry 301, and thus the audio circuitry 301 may be configured to determine whether there is an error in the buffer output signal BFR_OUT via the first comparing module 380 of the audio circuitry 301. The operation of the first comparing module 380 may be controlled by the warning signal control circuitry 200. Accordingly, the first comparing module 380 may receive the third and fourth error check codes from the second and third code generators (e.g., CRC code generator 340_1 and CRC code generator 340_2), respectively, and compare said third and fourth error check codes.

If it is determined, at the first comparing module 380, that the CRC code of the first buffer error check signal MOD_OUT' and the CRC code of the second buffer error check signal BFR_OUT' are identical to each other, the first comparing module 380 may output (e.g., generate, transmit, etc.) the first comparison output signal COM_OUT0 including the first information to the external interface 370. At this time, the first information may include a command that causes the external interface 370 to perform a protocol generation or conversion operation in the external interface 370.

According to some example embodiments, if it is determined, at the first comparing module 380, that the CRC code of the first buffer error check signal MOD_OUT' is different from the CRC code of the second buffer error check signal BFR_OUT', the first comparing module 380 may not output the first comparison output signal COM_OUT0.

According to some example embodiments, if it is determined, at the first comparing module 380, that the CRC code of the first buffer error check signal MOD_OUT' is different from the CRC code of the second buffer error check signal BFR_OUT', the first comparing module 380 may output the second signal to the warning signal control circuitry 200, without outputting the first comparison output signal COM_OUT0. The second signal may include information on which an error is detected in the buffer output signal BFR_OUT. According to some example embodiments, the warning signal control circuitry 200 may output a command to transmit the modulation output signal MOD_OUT to the buffer again to the audio circuitry 301 when the second signal is received.

Accordingly, it will be understood that the first comparing module 380 may output a comparison output signal (COM_OUT0) that indicates whether the third and fourth error check codes are identical to each other, based on comparing the third and fourth error check codes, and that a determination as to whether the first output signal (SIG_OUT) is output by the external interface 370 to the outside (e.g., a device external to the semiconductor device 10) may be performed, for example by the external interface 370 as selectively outputting the first output signal (SIG_OUT), based on the comparison output signal (COM_OUT0).

Figure 4:
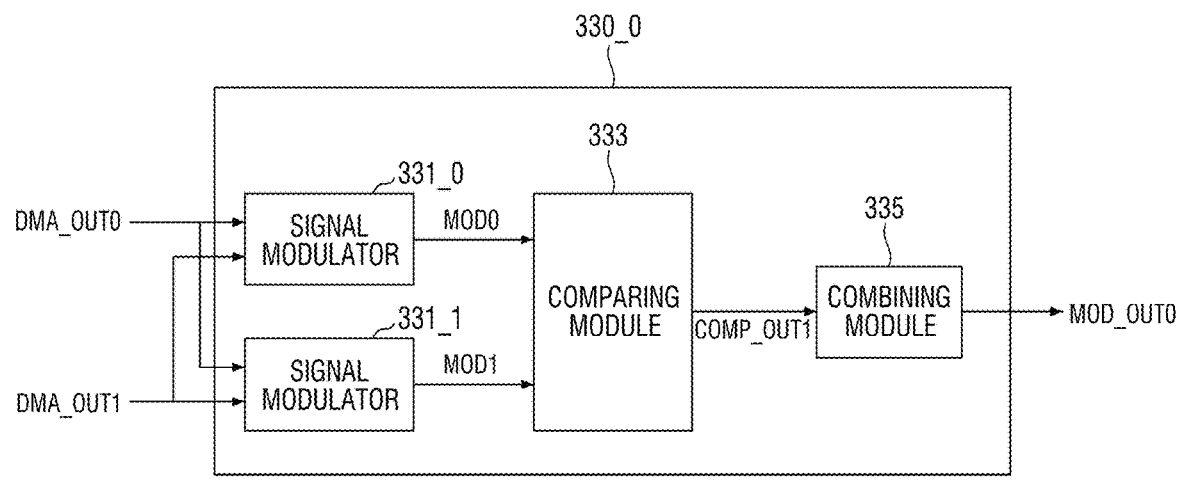
FIG. 4 is a block diagram for explaining a signal modulation module of FIGS. 2 and 3.

FIG. 4 is a block diagram for explaining the signal modulation module of FIGS. 2 and 3. It will be understood that some or all of the elements, modules, circuitry, and the like shown in the signal modulation module 330_0 of FIG. 4, which may replace the signal modulation module 330 of any of the example embodiments described herein, may be included in and/or implemented by one or more instances of processing circuitry, including one or more processors executing one or more programs of instructions stored in one or more memories, such that it will be understood that an audio circuitry according to any of the example embodiments may be configured to perform some or all of the functionality of the signal modulation module 330_0. Hereinafter, the configuration and the operation of the signal modulation module 330_0 including the signal modulators 331_0 and 331_1, the second comparing module 333, and the first combining module 335 will be explained referring to FIGS. 2 to 4.

The signal modulation module 330_0 may include (e.g., may implement) a first signal modulator 331_0, a second signal modulator 331_1, a second comparing module 333, and a first combining module 335. Accordingly, it will be understood that the signal modulation module 330_0, and thus audio circuitry 300 and/or 301 of the semiconductor device 10, may perform any of the functions described herein with regard to the elements included in the signal modulation module 330_0.

The first signal modulator 331_0 may receive the first DMA output signal DMA_OUT0 and the second DMA output signal DMA_OUT1 (and thus may receive the first and second data), perform the modulation operation of the received signals, and may output (e.g., generate, transmit, etc.) a modulation signal MOD0. The modulation signal MOD0 may include a first modulation signal that is generated based on modulating the first data (e.g., DMA_OUT0) and a second modulation signal that is generated based on modulating the second data (e.g., DMA_OUT1). According to some example embodiments, an amplitude modulation operation of the first DMA output signal DMA_OUT0 and the second DMA output signal DMA_OUT1 may be performed. According to some example embodiments, a frequency modulation operation of the first DMA output signal DMA_OUT0 and the second DMA output signal DMA_OUT1 may be performed. The first signal modulator 331_0 may adjust the sound volume of the output that is output from the external device coupled to pad 30, through the amplitude modulation or the frequency modulation of the received audio signals. For example, the modulation may be performed so that the sound volume of the first DMA output signal DMA_OUT0 corresponding to the warning signal SIG_WRN is output to be relatively large, and the modulation may be performed so that the sound volume of the second DMA output signal DMA_OUT1 corresponding to the audio signal SIG_AD is output to be relatively small.

The second signal modulator 331_1 may perform the same operation as that of the first signal modulator 331_0.

That is, the amplitude or frequency modulation operation of the received first DMA output signal DMA_OUT0 and the second DMA output signal DMA_OUT1 may be performed to output the modulation signal MOD1. The modulation signal MOD1 may include a third modulation signal that is generated based on modulating the first data (e.g., DMA_OUT0) and a fourth modulation signal that is generated based on modulating the second data (e.g., DMA_OUT1).

The second comparing module 333 may compare the modulation signal MOD0 and the modulation signal MOD1 to determine whether they are identical. As a result of comparison, if the modulation signal MOD0 and the modulation signal MOD1 are identical to each other, the second comparison result signal COMP_OUT1 may be output. If the modulation signal MOD0 and the modulation signal MOD1 are not identical to each other, the second comparison result signal COMP_OUT1 is not output, and a signal including the information on the comparison result may be transmitted to the warning signal control circuitry 200. The second comparison result signal COMP_OUT1 may include the modulation signal MOD0 and the modulation signal MOD1. The comparing may include receiving the modulation signal MOD0 that includes the first and second modulation signals, receiving the modulation signal MOD1 that includes the third and fourth modulation signals, and transmitting the first and second modulation signals to the first combining module 335, for example as part of the second comparison result signal COMP_OUT1, only in response to a determination, at the second comparing module 333, that the first and third modulation signals (e.g., the modulation signals of modulation signals MOD0 and MOD1 that are generated based on modulating the first data) are identical to each other.

The first combining module 335 may receive the second comparison result signal COMP_OUT1 and output a modulation output signal MOD_OUT0 on the basis thereof. According to some example embodiments, the first combining module 335 may combine the modulation signal MOD0 and the modulation signal MOD1 and output it as a modulation output signal MOD_OUT0. Accordingly, it will be understood that the first combining module 335 may output a first combined signal (e.g., MOD_OUT0) based on the first and second modulation signals included in the modulation signal MOD0 and/or the third and fourth modulation signals included in the modulation signal MOD1.

Figure 5:
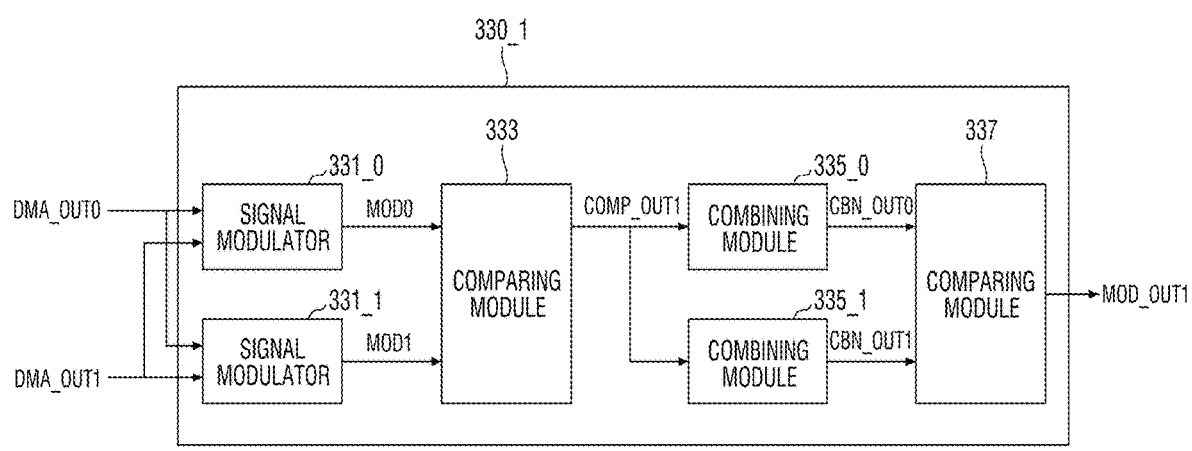
FIG. 5 is a block diagram for explaining the signal modulation module including a plurality of combining modules of FIGS. 2 and 3.

FIG. 5 is a block diagram for explaining a signal modulation module including the plurality of combining modules of FIGS. 2 and 3. It will be understood that some or all of the elements, modules, circuitry, and the like shown in the signal modulation module 330_1 of FIG. 5, which may replace the signal modulation module 330 of any of the example embodiments described herein, may be included in and/or implemented by one or more instances of processing circuitry, including one or more processors executing one or more programs of instructions stored in one or more memories, such that it will be understood that an audio circuitry according to any of the example embodiments may be configured to perform some or all of the functionality of the signal modulation module 330_1. Hereinafter, configuration and operation of a signal modulation module 330_1 further including the second combining module 335_1 and the third comparing module 337 will be described. However, description of the repeated parts of the contents described with reference to FIGS. 1 to 4 will not be provided.

Referring to FIG. 5, the signal modulation module 330_1 according to some example embodiments of the present inventive concepts may further include a second combining module 335_1 and a third comparing module 337. Accordingly, it will be understood that the signal modulation module 330_1 may perform any of the functions described herein with regard to the elements included in the signal modulation module 330_1. The first combining module 335_0 may receive the second comparison result signal COMP_OUT1 and output a combined output signal CBN_OUT0 on the basis thereof. According to some example embodiments, the first combining module 335_0 may combine the signals included in the second comparison result signal COMP_OUT1, that is, the first DMA output signal DMA_OUT0 and the second DMA output signal DMA_OUT1 and may output the signals as the combined output signal CBN_OUT0. Accordingly, it will be understood that the first combining module 335_0 may output (e.g., generate) a first combined signal (e.g., CBM_OUT0) based on the first and second modulation signals included in the modulation signal MOD0 and/or the third and fourth modulation signals included in the modulation signal MOD1.

The second combining module 335_1 may perform the same operation as that of the first combining module 335_0. That is, the second combining module 335_1 may receive the second comparison result signal COMP_OUT1 and output a combined output signal CBN_OUT1 on the basis thereof. Accordingly, it will be understood that the second combining module 335_1 may output (e.g., generate) a second combined signal (e.g., CBM_OUT1) based on the first and second modulation signals included in the modulation signal MOD0 and/or the third and fourth modulation signals included in the modulation signal MOD1. According to some example embodiments, the second combining module 335_1 may combine the signals included in the second comparison result signal COMP_OUT1, that is, the modulation signals of the first DMA output signal DMA_OUT0 and the second DMA output signal DMA_OUT1 and may output the modulation signals as the combined output signal CBN_OUT1.

A third comparing module 337 may compare the combined output signal CBN_OUT0 with the combined output signal CBN_OUT1 to determine whether they are identical to each other. If the combined output signal CBN_OUT0 and the combined output signal CBN_OUT1 are identical to each other as the comparison result at the third comparing module 337, the modulation output signal MOD_OUT1 may be output. If the combined output signal CBN_OUT0 and the combined output signal CBN_OUT1 are not identical to each other, the modulation output signal MOD_OUT1 is not output, and a signal including information on the comparison result may be transmitted to the warning signal control circuitry 200. Accordingly, it will be understood that the third comparing module 337 may receive first and second combined signals (CBN_OUT0 and CBN_OUT1) and may output any one signal of the first and second combined signals (CBN_OUT0 and CBN_OUT1) only in response to a determination, for example at the third comparing module 337, that the first combined signal (CBN_OUT0) and the second combined signal (CBN_OUT1) are identical to each other.

As explained referring to FIGS. 4 and 5, by including a plurality of signal modulators 331_0 and 331_1 and/or a plurality of combining modules 335_0 and 335_1, it is possible to determine whether there is an error in the signal, in particular, the warning signal SIG_WRN, and thus, the warning signal SIG_WRN in which an error has occurred may not be output or may be corrected and output. That is, by including a plurality of signal modulators 331_0 and 331_1 for performing the same operation, errors that may occur in the modulation process of signal may be detected early by the semiconductor device 10. Also, by including a plurality of combining modules 335_0 and 335_1 that perform the same operation, errors that may occur in the combination process of signal may be detected early by the semiconductor device 10.

Figure 6:
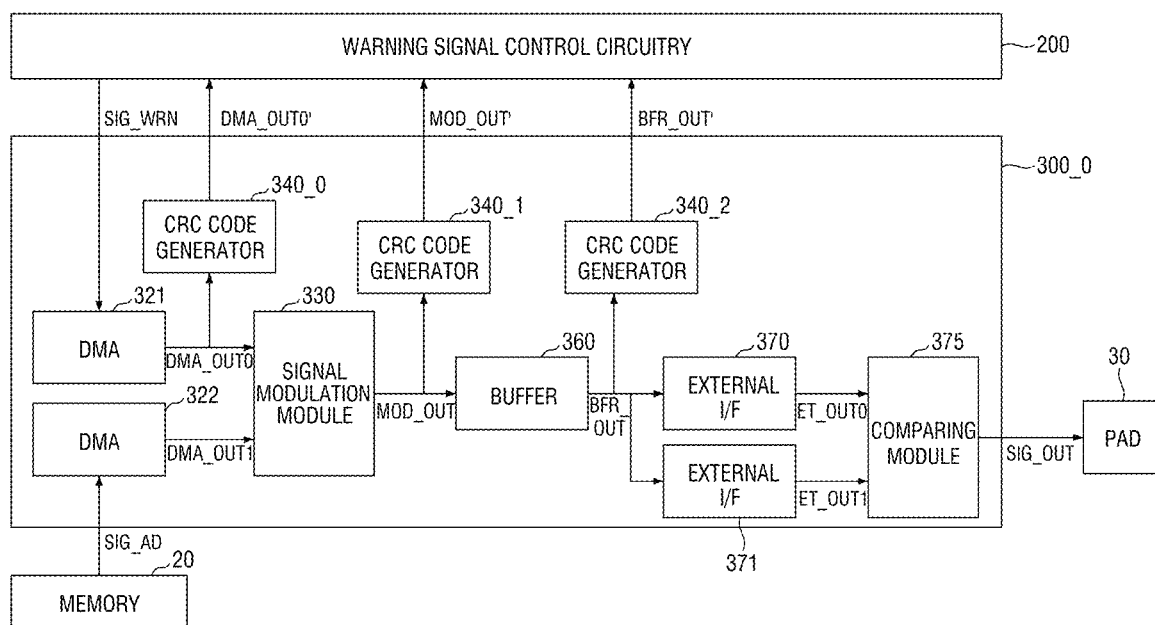
FIG. 6 is a block diagram for explaining a semiconductor device including a plurality of external interfaces according to some example embodiments of the present inventive concepts.

FIG. 6 is a block diagram for explaining a semiconductor device including a plurality of external interfaces according to some example embodiments of the present inventive concepts. For the convenience of description, differences from the semiconductor device described with reference to FIG. 2 will be mainly described. It will be understood that some or all of the elements, modules, circuitry, and the like shown in the audio circuitry 300_0 of FIG. 6 may be included in and/or implemented by one or more instances of processing circuitry of the audio circuitry 300_0, including one or more processors executing one or more programs of instructions stored in one or more memories, such that the audio circuitry 300_0 will be understood to perform some or all of the functionality of the elements of the audio circuitry 300_0 as described herein.

Referring to FIG. 6, an audio circuitry 300_0 according to some example embodiments of the present inventive concepts may further include an external interface 371, also referred to herein as a second interface, and a fourth comparing module 375.

The external interface 371 may perform the same operation as the external interface 370. That is, the external interface 371 receives the buffer output signal BFR_OUT and executes a generation or conversion operation of protocol to correspond to the external device with which it communicates.

The external interface 370 may generate and output an external signal ET_OUT0, also referred to herein as a first output signal, and the external interface 371 may generate and output an external signal ET_OUT1, also referred to herein as a second output signal. It will be understood that each of the external interfaces 370 may generate the respective external signals ET_OUT0 based on the buffer output signal BFR_OUT.

The fourth comparing module 375 may receive each of the external signal ET_OUT0 and the external signal ET_OUT1 from the external interface 370 and the external interface 371 and perform the comparing operation of the received signals.

If it is determined, at the fourth comparing module 375, that the external signal ET_OUT0 and the external signal ET_OUT1 are identical to each other as a result of comparison, the external output signal SIG_OUT is output from the fourth comparing module 375. The external output signal SIG_OUT that is output by the fourth comparing module 375 may be transmitted to the pad 30 and output to the outside through the pad.

If it is determined that the external signal ET_OUT0 and the external signal ET_OUT1 are different from each other as a result of comparison, the external signal SIG_OUT is not output and a signal including the comparison result information may be transmitted to the warning signal control circuitry 200.

Accordingly, it will be understood that the fourth comparing module 375 may output one output signal of the external signal ET_OUT0 or the external signal ET_OUT1 to an exterior of the semiconductor device 10 only in response to a determination that the external signals ET_OUT0 and ET_OUT1 are identical to each other.

Figure 7:
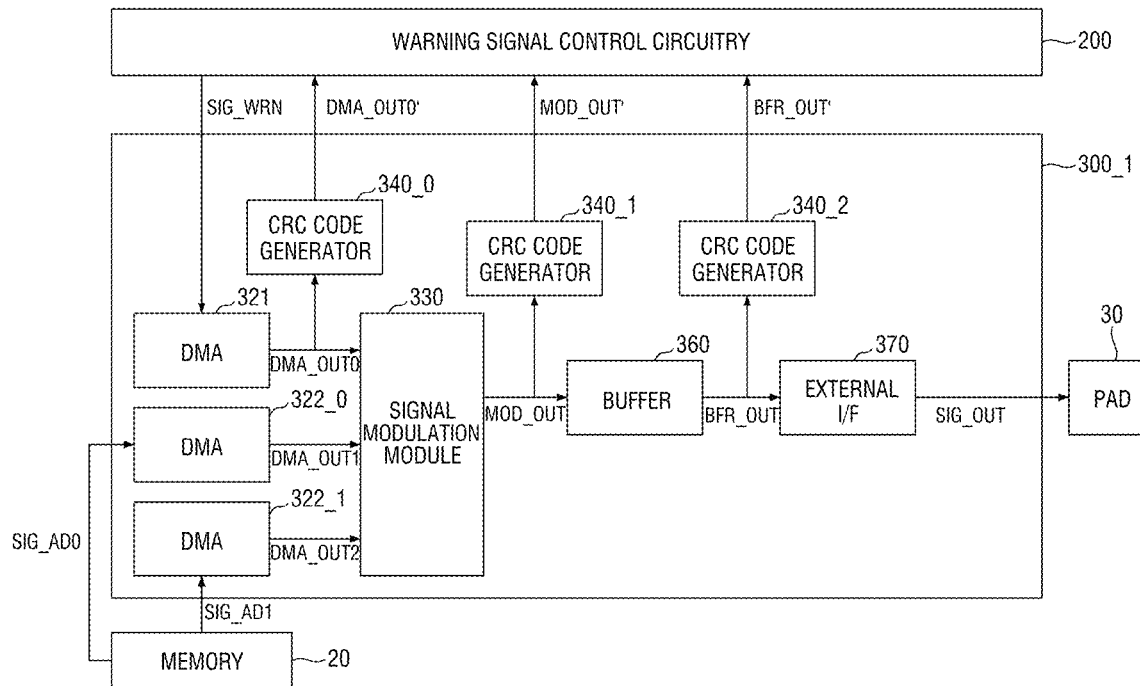
FIG. 7 is a block diagram for explaining a semiconductor device including an audio circuitry for receiving a plurality of audio data, according to some example embodiments of the present inventive concepts.

FIG. 7 is a block diagram for explaining a semiconductor device including an audio circuitry which receives a plurality of audio data, according to some example embodiments of the present inventive concepts. For the convenience of description, differences from the semiconductor device described with reference to FIG. 2 will be mainly described. It will be understood that some or all of the elements, modules, circuitry, and the like shown in the audio circuitry 300_1 of FIG. 7 may be included in and/or implemented by one or more instances of processing circuitry of the audio circuitry 300_1, including one or more processors executing one or more programs of instructions stored in one or more memories, such that the audio circuitry 300_1 will be understood to perform some or all of the functionality of the elements of the audio circuitry 300_1 as described herein.

Referring to FIG. 7, an audio circuitry 300_1 according to some example embodiments of the present inventive concepts may include a third DMA engine 322_0 and a fourth DMA engine 322_1 that receive audio signals SIG_AD0 and SIG_AD1, respectively, referred to as second data and third data, respectively. Although the drawing illustrates two DMA engines 322_0 and 322_1 that receive each of the two audio signals SIG_AD0 and SIG_AD1 as an example, the implementation of the present inventive concepts is not limited thereto, and it is a matter of course that a plurality of DMA engines each receiving three or more audio signals may be included.

According to some example embodiments, the signal modulation module 330 may the first DMA output signal DMA_OUT0, the second DMA output signal DMA_OUT1 and the third DMA output signal DMA_OUT2 and perform the modulation operation of the received signals. Accordingly, the signal modulation module 330 may output the first modulation signal (e.g., MOD_OUT) based on the first, second, and third data, and thus it will be understood that the audio circuitry 300_1 may modulate each of the warning signal (SIG_WRN) and the plurality of audio signals (SIG_AD0 and SIG_AD1). The process described with reference to FIG. 2 may be similarly applied to the operation and the subsequent operations of the signal modulation module 330.

Figure 8:
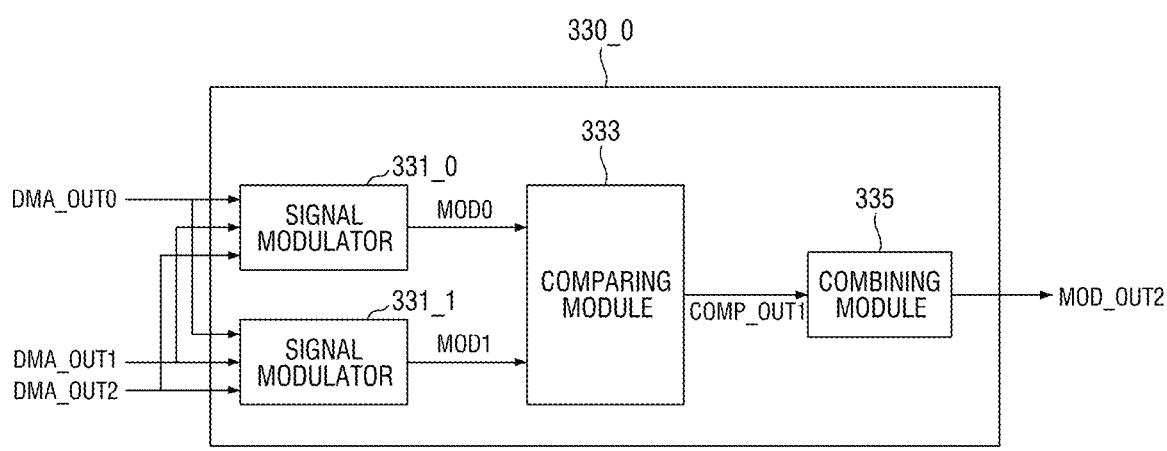
FIG. 8 is a block diagram for explaining the signal modulation module of FIG. 7.

FIG. 8 is a block diagram for explaining the signal modulation module of FIG. 7. For the convenience of description, differences from the semiconductor device described with reference to FIG. 4 will be mainly described. It will be understood that some or all of the elements, modules, circuitry, and the like shown in the signal modulation module 330_0 of FIG. 8, which may replace the signal modulation module 330 of any of the example embodiments described herein, may be included in and/or implemented by one or more instances of processing circuitry, including one or more processors executing one or more programs of instructions stored in one or more memories, such that it will be understood that an audio circuitry according to any of the example embodiments may be configured to perform some or all of the functionality of the signal modulation module 330_0.

Referring to FIG. 8, the signal modulation module 330_0 according to some example embodiments of the present inventive concepts may include two signal modulators 331_0 and 331_1 that perform the same operation. Each of the respective signal modulators 331_0 and 331_1 receives the first DMA output signal DMA_OUT0, the second DMA output signal DMA_OUT1 and the third DMA output signal DMA_OUT2 and performs the frequency modulation or the amplitude modulation of the received signals DMA_OUT0, DMA_OUT1 and DMA_OUT2. The same process as described with reference to FIG. 4 may be performed to the modulation operation.

Figure 9:
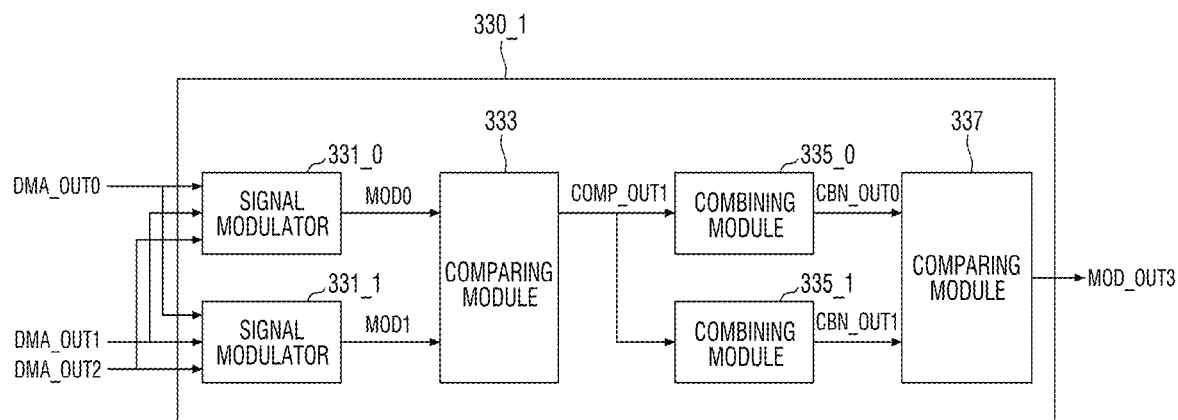
FIG. 9 is a block diagram for explaining the signal modulation module including the plurality of combining modules of FIG. 7.

FIG. 9 is a block diagram for explaining a signal modulation module including the plurality of combining modules of FIG. 7. For the convenience of description, differences from the semiconductor device described with reference to FIG. will be mainly described. It will be understood that some or all of the elements, modules, circuitry, and the like shown in the signal modulation module 330_1 of FIG. 9, which may replace the signal modulation module 330 of any of the example embodiments described herein, may be included in and/or implemented by one or more instances of processing circuitry, including one or more processors executing one or more programs of instructions stored in one or more memories, such that it will be understood that an audio circuitry according to any of the example embodiments may be configured to perform some or all of the functionality of the signal modulation module 330_1.

Referring to FIG. 9, a signal modulation module 330_1 according to some example embodiments of the present inventive concepts may include two combining modules 335_0 and 335_1 that perform the same operation. The combining module 335_0 and 335_1 may perform the same operation as those of the first combining module 335_0 and the second combining module 335_1 of FIG. 5. That is, the combining modules 335_0 and 335_1 may receive the second comparison result signal COMP_OUT1 and output the combined output signal CBN_OUT0 on the basis thereof. According to some example embodiments, the combining modules 335_0 and 335_1 combine the signals included in the second comparison result signal COMP_OUT1, i.e., the modulation signals of the first DMA output signal DMA_OUT0, the second DMA output signal DMA_OUT1 and the third DMA output signal DMA_OUT2, and may output the coupled modulation signals as a combined output signal CBN_OUT0 and a combined output signal CBN_OUT1.

Figure 10:
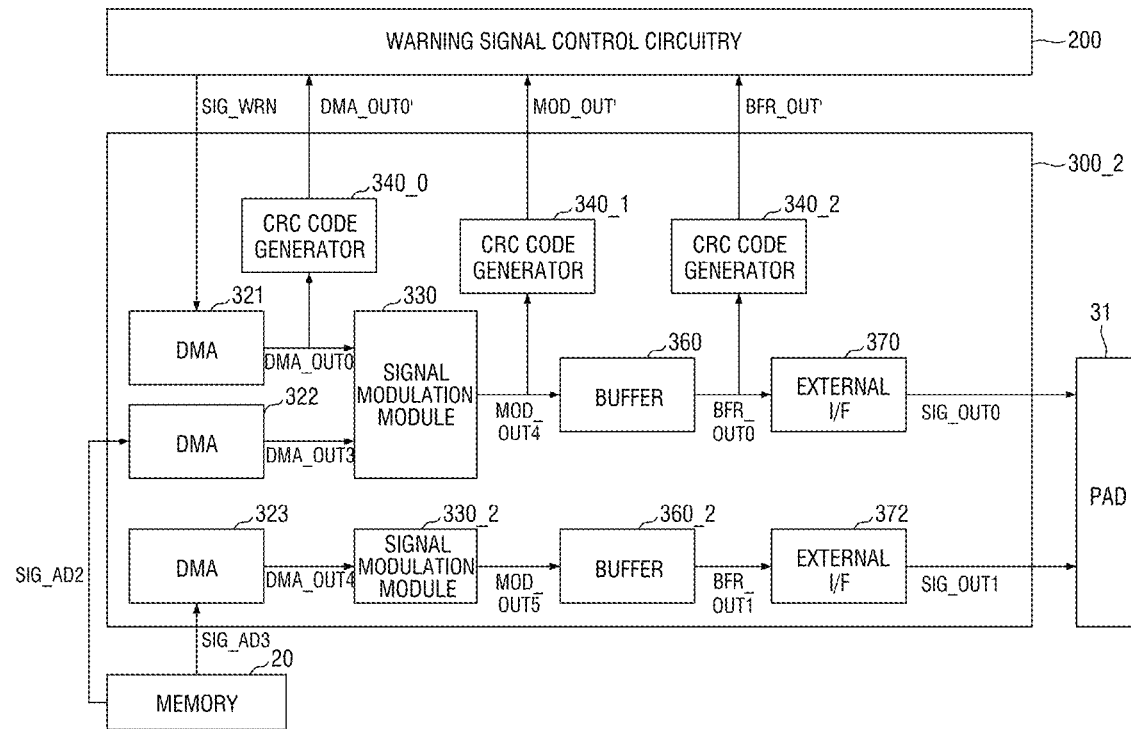
FIG. 10 is a block diagram for explaining the semiconductor device according to some example embodiments of the present inventive concepts.

FIG. 10 is a block diagram for explaining the semiconductor device according to some example embodiments of the present inventive concepts. For the convenience of description, differences from the semiconductor device described with reference to FIG. 2 will be mainly described. It will be understood that some or all of the elements, modules, circuitry, and the like shown in the audio circuitry 300_2 of FIG. 10 may be included in and/or implemented by one or more instances of processing circuitry of the audio circuitry 300, including one or more processors executing one or more programs of instructions stored in one or more memories, such that the audio circuitry 300_2 will be understood to perform some or all of the functionality of the elements of the audio circuitry 300_2 as described herein.

Referring to FIG. 10, the audio circuitry 300_2 according to some example embodiments of the present inventive concepts may further include a DMA engine 323 that receives the audio signal SIG_AD3 from the memory 20, a signal modulation module 330_2 that receives the DMA output signal DMA_OUT4 from the DMA engine 323 and performs modulation operations thereof, a buffer 360_2 that buffers the modulated signal, and an external interface 372 that receives the output of the buffer 360_2, outputs the external output signal SIG_OUT1 and transmits the output to the pad 31.

That is, the audio circuitry 300_2 may further include a DMA engine 323 that receives a signal SIG_AD3 on which modulation, buffering and protocol conversion operations are performed independently of the warning signal SIG_WRN. The same contents as described above with reference to FIG. 2 may be applied to the processes of transmission and output of the audio signal SIG_AD3. However, the error check operation using a CRC code may not be performed on the audio signal SIG_AD3. That is, by performing the error check operation only on a signal that is relatively high in importance (e.g., a warning signal), without performing the error check operation on a signal that is not relatively high in importance (e.g., an audio signal), it is possible to minimize a decrease in efficiency of system and reduce or prevent an occurrence of error in the warning signal SIG_WRN.

Figure 11:
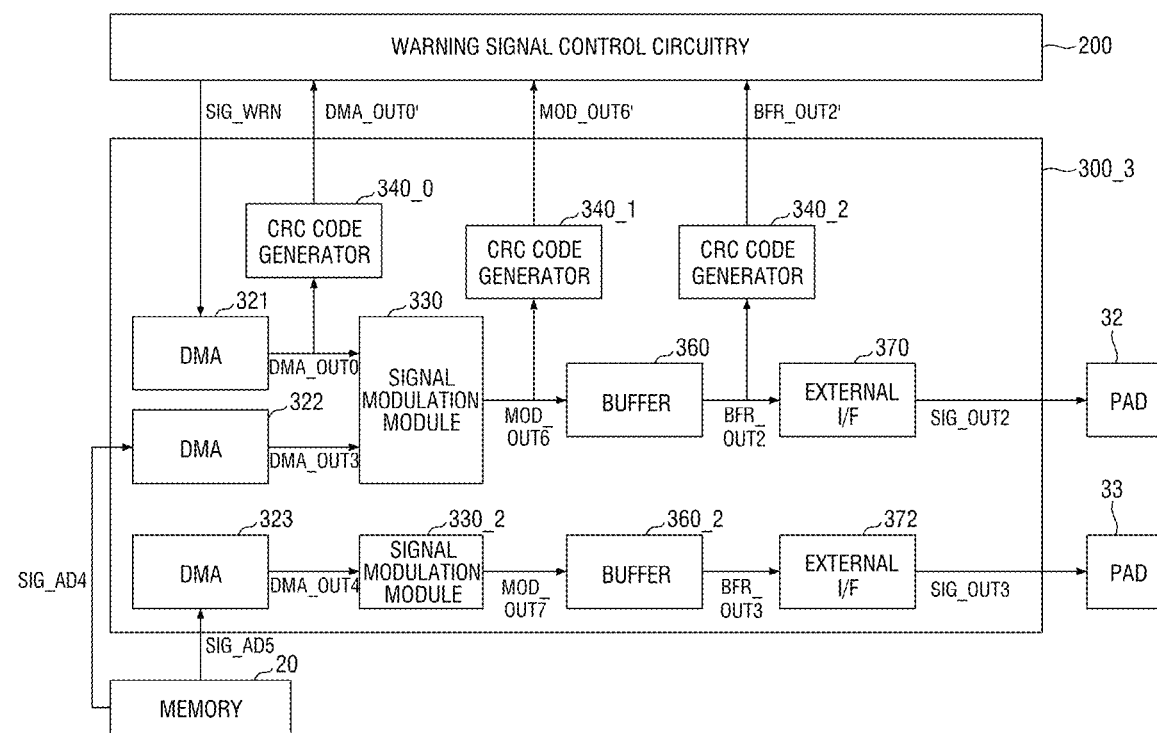
FIG. 11 is a block diagram for explaining the semiconductor device including a plurality of pads according to some example embodiments of the present inventive concepts.

FIG. 11 is a block diagram for explaining a semiconductor device including a plurality of pads according to some example embodiments of the present inventive concepts. For the convenience of description, differences from the semiconductor device described with reference to FIG. 10 will be mainly described. It will be understood that some or all of the elements, modules, circuitry, and the like shown in the audio circuitry 300_3 of FIG. 11 may be included in and/or implemented by one or more instances of processing circuitry of the audio circuitry 300_3, including one or more processors executing one or more programs of instructions stored in one or more memories, such that the audio circuitry 300_3 will be understood to perform some or all of the functionality of the elements of the audio circuitry 300_3 as described herein.

Referring to FIG. 11, the semiconductor device according to some example embodiments of the present inventive concepts may include a plurality of pads 32 and 33. According to some example embodiments, the semiconductor device may include a plurality of pads 32 and 33 corresponding to the respective audio signals SIG_AD4 and SIG_AD5, and may output external output signals SIG_OUT2 and SIG_OUT3 to an external device through the respective pads 32 and 33. Accordingly, it will be understood that the audio circuitry 300_3 may modulate each of the warning signal (SIG_WRN) and the plurality of audio signals (SIG_AD4 and SIG_AD5) and output each of the plurality of modulated audio signals to pads that are different from each other.

In some example embodiments, the audio circuitry 300_3 may modulate only one audio signal (e.g., SIG_AD4) of the audio signals and the warning signal SIG_WRN to establish the modulated warning signal and audio signal (MOD_OUT0).

Figure 12:
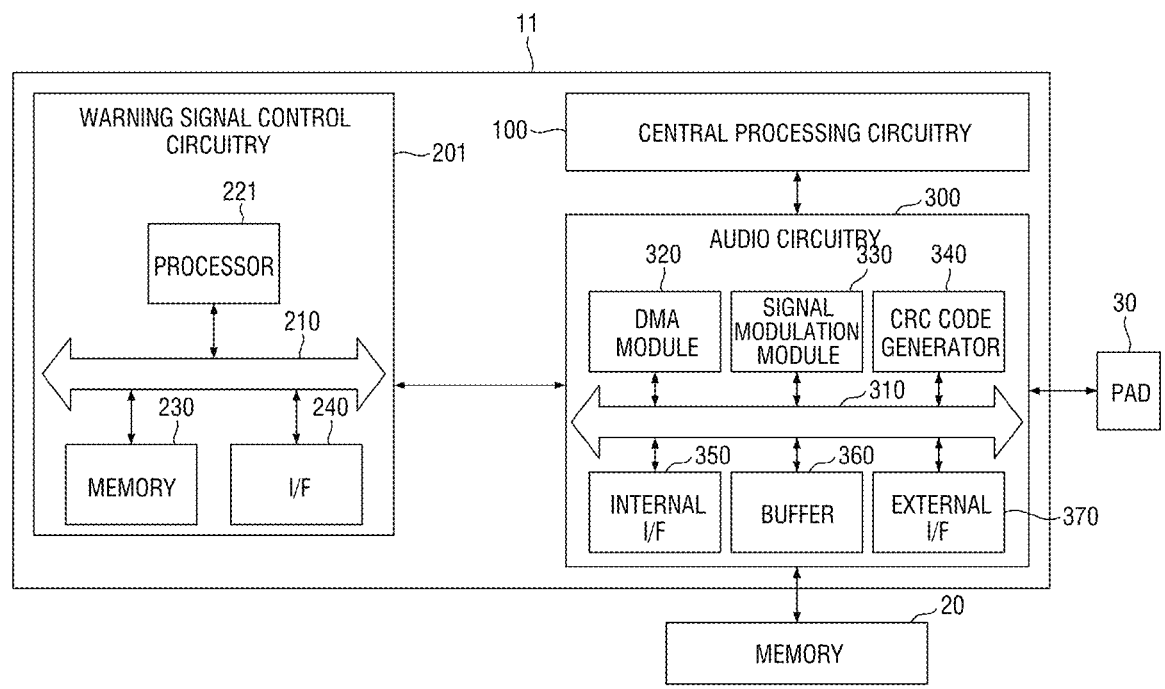
FIG. 12 is a block diagram for explaining the semiconductor device according to some example embodiments of the present inventive concepts.

FIG. 12 is a block diagram for explaining a semiconductor device according to some example embodiments of the present inventive concepts. For the convenience of description, differences from the semiconductor device described with reference to FIG. 1 will be mainly described.

Referring to FIG. 12, a semiconductor device 11 according to some example embodiments of the present inventive concepts may include a warning signal control circuitry 201 including one processor 221. That is, it may be implemented as a single processor 221 rather than a plurality of processors that performs the same operation.

Figure 13:
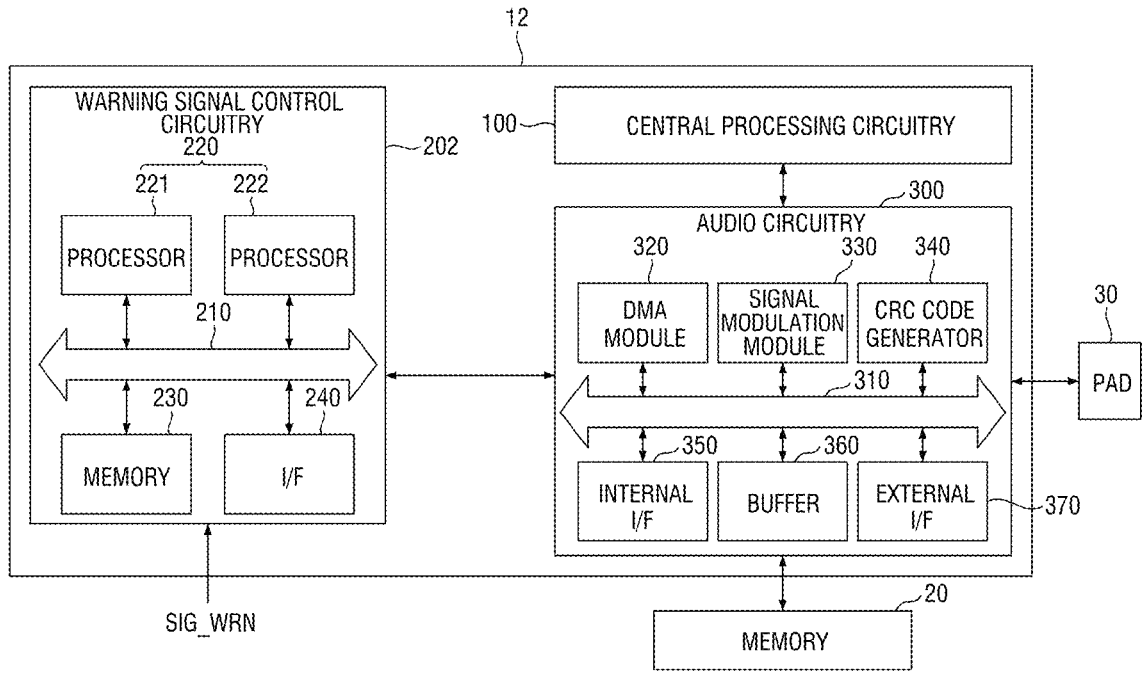
FIG. 13 is a block diagram for explaining the semiconductor device according to some example embodiments of the present inventive concepts.

FIG. 13 is a block diagram for explaining the semiconductor device according to some example embodiments of the present inventive concepts. For the convenience of description, differences from the semiconductor device described with reference to FIG. 1 will be mainly described.

Referring to FIG. 13, a warning signal control circuitry 202 according to some example embodiments of the present inventive concepts receives a warning signal SIG_WRN from the outside and performs an output operation to the external device. That is, the warning signal control circuitry 202 generates a CRC code on the basis of the warning signal SIG_WRN received from the outside and performs an output operation thereof.

Although it is not shown, an external interface that performs communication with the outside may be further included.

Figure 14:
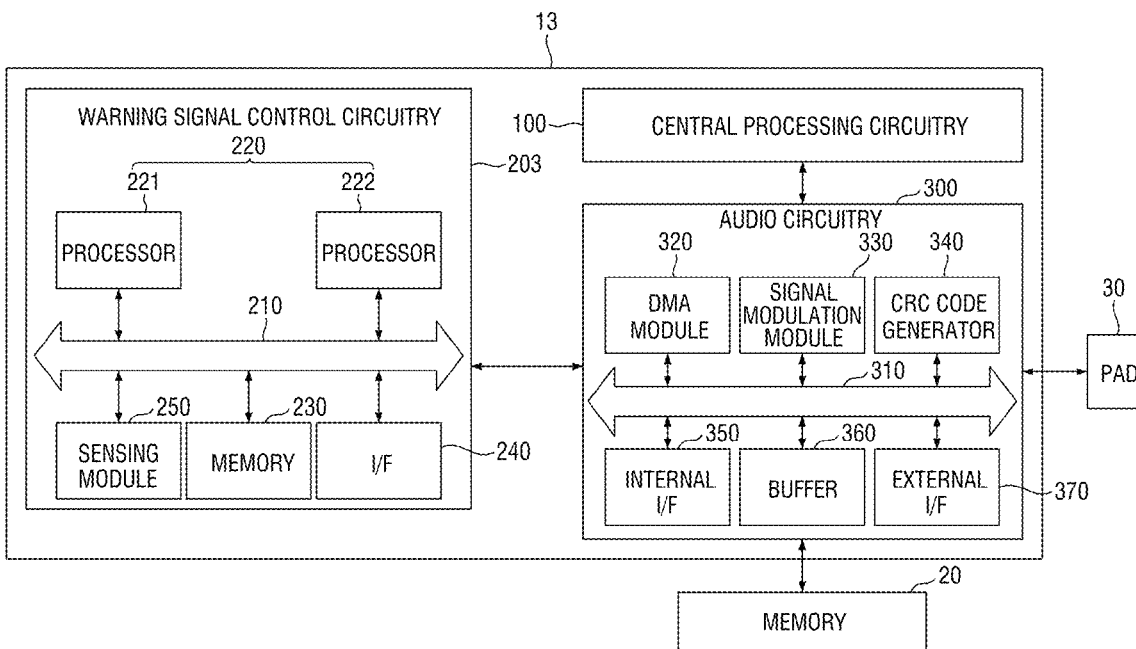
FIG. 14 is a block diagram for explaining the semiconductor device according to some example embodiments of the present inventive concepts.

FIG. 14 is a block diagram for explaining a semiconductor device according to some example embodiments of the present inventive concepts. For the convenience of description, differences from the semiconductor device described with reference to FIG. 1 will be mainly described.

Referring to FIG. 14, a warning signal control circuitry 203 of a semiconductor device 13 according to some example embodiments of the present inventive concepts may further include a sensing module 250. The warning signal control circuitry 203 may generate and output the warning signal SIG_WRN when a specific situation is detected by the sensing module 250.

According to some example embodiments, the sensing module 250, which may be referred to as a sensor, may include at least one of an infrared (IR) sensor, a passive infrared sensor (PIR) sensor, and an ultrasonic sensor.

According to some example embodiments, the sensing module 250 may include a proximity sensor for detecting proximity of other vehicles, pedestrians, animals, etc.

According to some example embodiments, the sensing module 250 may include various sensors such as a sensor (e.g., a touch sensor, and a pen detection sensor) for detecting user's interaction, a sensor for detecting movement information of a transport device (e.g., an acceleration sensor, and a gyro sensor), and a sensor for detecting a surrounding condition of a vehicle (e.g., an illumination sensor, and a noise sensor (e.g., a microphone)).

According to some example embodiments, the sensing module 250 may detect a facial expression, a gaze, a behavior, and the like of a driver. In this case, the first processor 221 and the second processor 222 may determine that the driver is in a drowsy state through the facial expression of the driver detected through the sensing module 250. For example, the first processor 221 and the second processor 222 may determine that the driver is in a drowsy state when the driver often yawns or the number of blinks of the eye increases.

Figure 15:
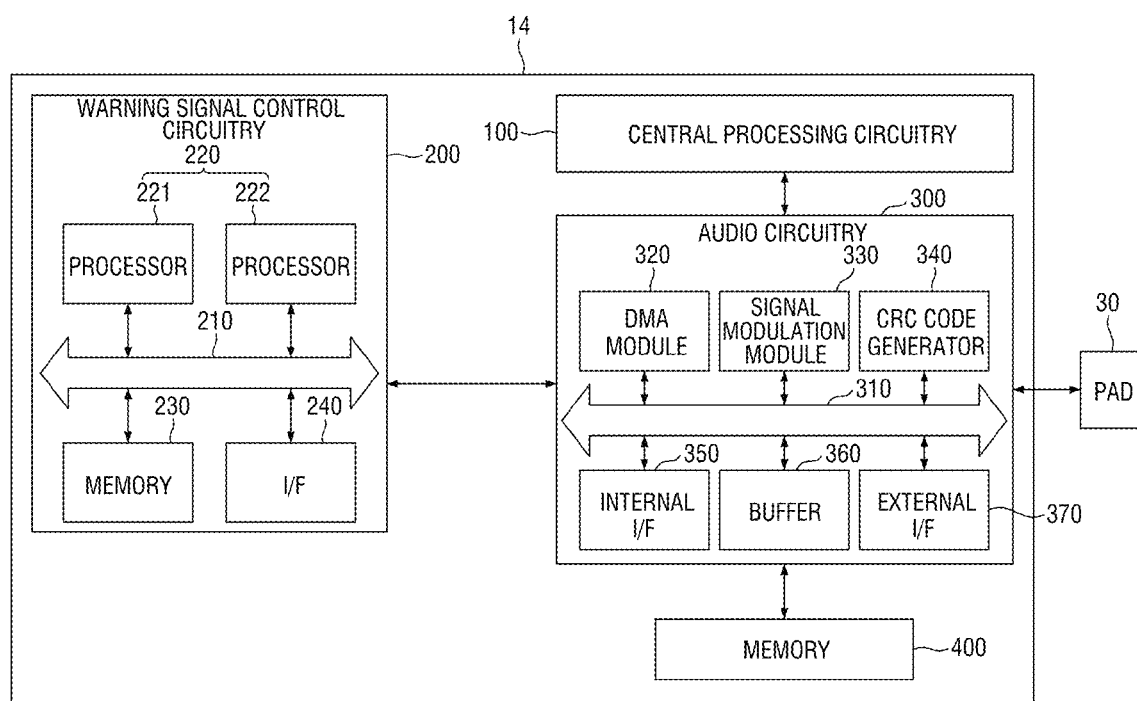
FIG. 15 is a block diagram for explaining the semiconductor device according to some example embodiments of the present inventive concepts.

FIG. 15 is a block diagram for explaining the semiconductor device according to some example embodiments of the present inventive concepts. For the convenience of description, differences from the semiconductor device described with reference to FIG. 1 will be mainly described.

Referring to FIG. 15, a semiconductor device 14 according to some example embodiments of the present inventive concepts may include an internal memory 400. The internal memory 400 may store data necessary for driving the central processing circuitry 100 or the audio circuitry 300. For example, the audio signal SIG_AD that is output to the outside according to the signal processing of the audio circuitry 300 may be stored. In addition, the internal memory 400 may function as an operation memory for driving the central processing circuitry 100.

Since the semiconductor device 14 includes the internal memory 400, a chip area may be reduced by loading data necessary for operation without using an external interface, and the operation speed may be improved.

Figure 16:
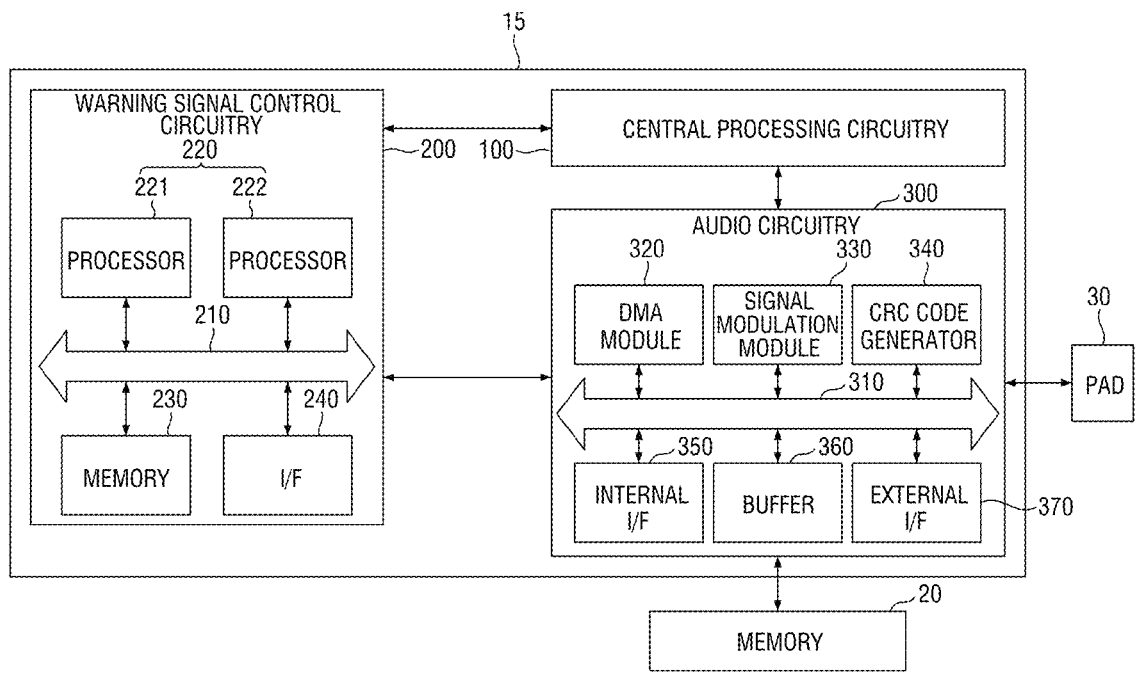
FIG. 16 is a block diagram for explaining the semiconductor device according to some example embodiments of the present inventive concepts.

FIG. 16 is a block diagram for explaining the semiconductor device according to some example embodiments of the present inventive concepts. For the convenience of description, differences from the semiconductor device described with reference to FIG. 1 will be mainly described.

Referring to FIG. 16, a semiconductor device 15 according to some example embodiments of the present inventive concepts may perform communication between the central processing circuitry 100 and the warning signal control circuitry 200. That is, although the warning signal control circuitry 200 is independent of the control of the central processing circuitry 100 and may perform processing operations of the warning signal SIG_WRN such as reception or generation of the warning signal SIG_WRN and generation of a CRC code, the warning signal control circuitry 200 is connected to the central processing circuitry 100 that controls the overall operation of the semiconductor device 15, and may operate in accordance with the control of the central processing circuitry 100.

According to some example embodiments, the warning signal control circuitry 200 receives the warning signal SIG_WRN from the outside or generates the warning signal SIG_WRN by sensing of the sensing module (250 of FIG. 14) and may generate a CRC code of the warning signal SIG_WRN. Such operations may be performed on the basis of the control of the central processing circuitry 100.

Figure 17:
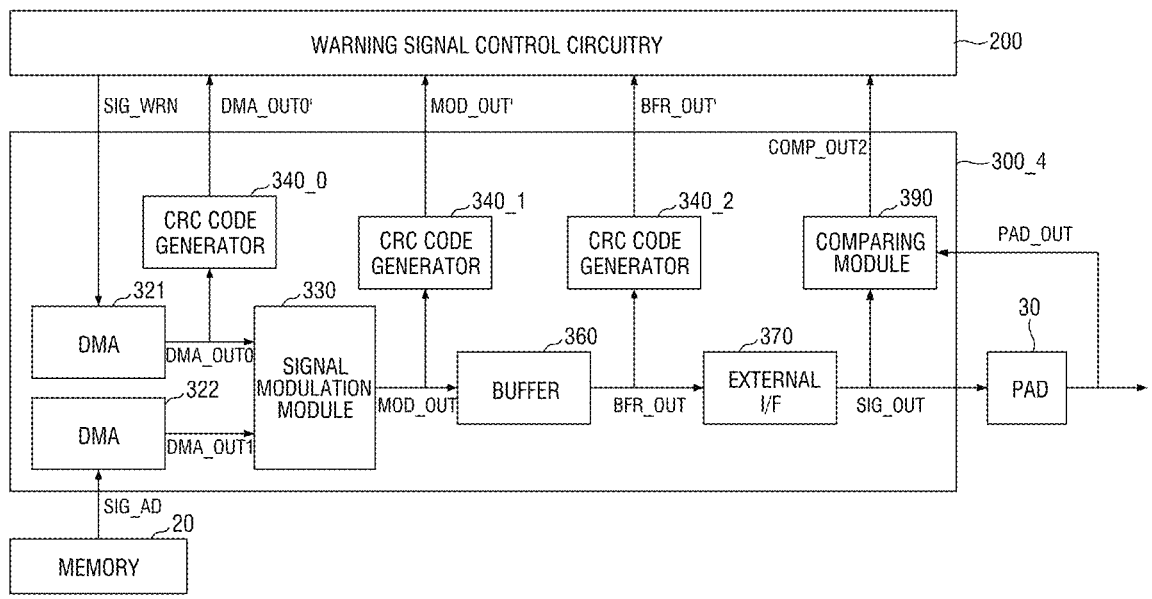
FIG. 17 is a block diagram of a semiconductor device including a comparing module that compares feedback signals of a pad according to some example embodiments of the present inventive concepts.

FIG. 17 is a block diagram for explaining a semiconductor device including a comparing module that compares feedback signals of the pad according to some example embodiments of the present inventive concepts. For the convenience of description, differences from the semiconductor device described with reference to FIG. 2 will be mainly described. It will be understood that some or all of the elements, modules, circuitry, and the like shown in the audio circuitry 300_4 of FIG. 17 may be included in and/or implemented by one or more instances of processing circuitry of the audio circuitry 300_4, including one or more processors executing one or more programs of instructions stored in one or more memories, such that the audio circuitry 300_4 will be understood to perform some or all of the functionality of the elements of the audio circuitry 300_4 as described herein.

Referring to FIG. 17, an audio circuitry 300_4 according to some example embodiments of the present inventive concepts may further include a fifth comparing module 390 which receives a pad output signal PAD_OUT that is output by the pad 30 to an external device and an external output signal SIG_OUT that is output to the pad 30, compares the received pad output signal PAD_OUT with the external output signal SIG_OUT, and outputs a comparison result signal COMP_OUT2 thereof. It will be understood that the audio circuitry 300_4 may be configured to cause the pad 30 to output the pad output signal PAD_OUT, which may be an output warning signal, based on outputting the external output signal SIG_OUT to the pad 30.

The fifth comparing module 390 may determine whether the external output signal SIG_OUT which is an input signal of the pad 30 is identical to the pad output signal PAD_OUT which is a signal output from the pad 30. That is, the comparison result signal COM_OUT2, which is the output of the fifth comparing module 390, may include information on whether the input/output of the pad 30 are identical. The audio circuitry 300 may thus transmit the comparison result signal COM_OUT2 to the warning signal control circuitry 200 (e.g., to processor 221 and/or processor 222) based on comparing the modulated warning signal that is output to the pad 30 (e.g., SIG_OUT) with the output warning signal (e.g., PAD_OUT).

By comparing the input/output of the pad 30 by the fifth comparing module 390, it is possible to reduce or prevent an error that may occur in the process in which the external output signal SIG_OUT is output through the pad 30.

According to some example embodiments, the fifth comparing module 390 may transmit the comparison result signal COMP_OUT2 to the warning signal control circuitry 200. If the comparison result signal COMP_OUT2 includes information in which the external output signal SIG_OUT and the pad output signal PAD_OUT are not identical to each other, the warning signal control circuitry 200 may transmit such information to the external device. Thus, the external device may not output the pad output signal PAD_OUT as voice.

Figure 18:
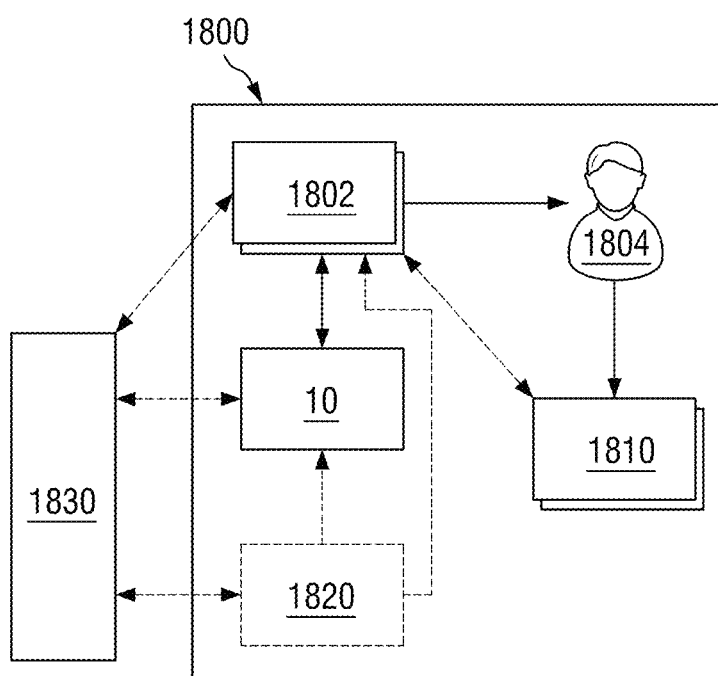
FIG. 18 is a block diagram for explaining a vehicle that includes a semiconductor device according to some example embodiments of the inventive concepts.

FIG. 18 is a block diagram for explaining a vehicle 1800 that includes a semiconductor device 10 according to some example embodiments of the inventive concepts.

Referring to FIG. 18, a vehicle 1800 may be any known vehicle, including an automobile. In some example embodiments, vehicle 1800 may be a semiautonomous or fully autonomous vehicle. As shown, vehicle 1800 may include semiconductor device 10, which may be any semiconductor device 10 according to any of the example embodiments, an external device 1802, and one or more driving control elements 1810 that may cause the vehicle 1800 to be driven (navigated) through an environment. The one or more driving control elements may include any of a drivetrain, powertrain, steering control system, braking control system, throttle control system, or the like which are well-known in the art. As shown, the vehicle 1800 may include one or more sensors 1820 which may be configured to monitor the surrounding environment external to and/or internal to the vehicle 1800 (e.g., monitor an occupant 1804). As shown, one or more occupants 1804, which may include one or more human occupants, may occupy one or more portions of the vehicle 1800, including an internal cabin of the vehicle 1800.

Still referring to FIG. 18, in some example embodiments, the semiconductor device 10 is configured to output an output signal (e.g., PAD_OUT) to the external device 1802. The external device 1802 may be an external audio output device (e.g., an audio driver, speaker, or the like) and the output signal that is output by the semiconductor device 10 may cause the external device 1802 to output an audio signal and/or warning signal that may be observed by an occupant 1804 (e.g., driver) of the vehicle 1800 to provide a warning, notification, or the like to the occupant 1804. The external device 1802 may be a display device, and the output signal that is output by the semiconductor device 10 may cause the external device 1802 to output a display (e.g., image, video, or the like) that may be observed by the occupant 1804 to provide a warning, notification, or the like to the occupant 1804.

In some example embodiments, the output signal that is output by the semiconductor device 10 may cause the external device 1802 to output a signal to cause the occupant 1804 to control one or more of the driving control element 1810 to control the driving of the vehicle 1800 through an environment.

For example, the semiconductor device 10 may output the output signal PAD_OUT based on a sensor of the semiconductor device 10 and/or a sensor 1820 of the vehicle 1800 generating sensor data that may be processed to determine the presence of an external object 1830 in the surrounding environment, and the external device 1802 may generate an output, based on the output signal, to inform the occupant 1804 of the presence of the object 1830, to prompt the occupant 1804 to control one or more driving control element 1810 to adjust the navigation trajectory of the vehicle 1800 based on the object 1830 (e.g., to avoid the object 1830).

In another example, the semiconductor device 10 may output the output signal PAD_OUT based on a sensor of the semiconductor device 10 and/or a sensor 1820 of the vehicle 1800 generating sensor data that may be processed to determine a particular state or condition of an occupant 1804 that is a driver of the vehicle 1800, and the external device 1802 may generate an output, based on the output signal, to inform the occupant 1804 of the state or condition, to prompt the occupant 1804 to control one or more driving control element 1810 to adjust the navigation trajectory of the vehicle 1800 based on the determined condition or state.

In some example embodiments, the external device 1802 may be a plurality of external devices 1802, and each external device 1802 configured to provide a same or different output based on the output signal PAD_OUT of the semiconductor device 10.

In some example embodiments, the vehicle 1800 is a semiautonomous or fully autonomous vehicle, and at least one external device 1802 may be an ADAS that is configured to control some or all of the driving control elements 1810 based on and/or in concert with the output signal PAD_OUT generated by the semiconductor device 10. For example, where the vehicle 1800 includes a plurality of external devices 1802, where one external device 1802 is an ADAS and another external device 1802 is an audio driver, the ADAS may control one or more driving control elements 1810 (e.g., based on detection of the object 1830 by sensor 1820 and/or a sensor of the semiconductor device 10) concurrently with the audio driver providing an audio signal and/or warning signal to the occupant 1804 (e.g., based on detection of the object 1830 by sensor 1820 and/or a sensor of the semiconductor device 10). The external device 1802 that is an ADAS may provide a warning signal and/or audio signal to the semiconductor device 10 to cause the semiconductor device to output a signal to the separate external device 1802 that is an external audio output device, concurrently with the external device 1802 that is an ADAS at least partially controlling one or more driving control elements 1810 to at least partially control the driving of the vehicle 1800.

In concluding the detailed description, those skilled in the art will appreciate that many variations and modifications may be made to the example embodiments without substantially departing from the principles of the present inventive concepts. Therefore, the disclosed example embodiments of the inventive concepts are used in a generic and descriptive sense only and not for purposes of limitation.

What is claimed is:

1. A semiconductor device, comprising:
    a first processor configured to generate a first error check code of a first data; and
    an audio circuitry configured to
        receive the first data,
        receive a second data,
        generate a second error check code of the first data, and
        generate a first modulation signal, based on the first and second data,
    wherein the first processor is configured to
        determine whether the first and second error check codes are identical to each other, and
        control the generation of the first modulation signal based on at least the first data in response to a determination that the first and second error check codes are identical to each other.

2. The semiconductor device of claim 1, wherein the audio circuitry is configured to generate the first modulation signal based on modulating the first data,
generate a second modulation signal based on modulating the second data, and
generate a first combined signal, based on the first and second modulation signals.

3. The semiconductor device of claim 2, wherein the audio circuitry is configured to
    generate a third modulation signal based on modulating the first data,
    generate a fourth modulation signal based on modulating the second data, and
    cause the first combined signal to be generated only in response to a determination that the first and third modulation signals are identical to each other.

4. The semiconductor device of claim 2, wherein the audio circuitry is configured to
    generate a second combined signal based on the first and second modulation signals, and
    output any one signal of the first and second combined signals only in response to a determination that the first and second combined signals are identical to each other.

5. The semiconductor device of claim 2, wherein the audio circuitry is configured to
    generate a third modulation signal based on modulating the first data,
    generate a fourth modulation signal based on modulating the second data,
    cause the first combined signal to be generated only in response to a determination that the first and third modulation signals are identical to each other;
    generate a second combined signal based on the first and second modulation signals, and
    output any one signal of the first and second combined signals only in response to a determination that the first and second combined signals are identical to each other.

6. The semiconductor device of claim 1, the audio circuitry further configured to
    generate a third error check code of the first modulation signal;
    temporarily store the first modulation signal in a buffer;
    generate a fourth error check code of a buffer output signal that is output from the buffer; and
    generate a first output signal based on the buffer output signal,
    wherein the first processor is configured to control transmission of the first output signal to an external device only in response to a determination that the third and fourth error check codes are identical to each other.

7. The semiconductor device of claim 6, the audio circuitry further configured to
    generate a comparison output signal that indicates whether the third and fourth error check codes are identical to each other based on comparing the third and fourth error check codes, and
    selectively transmit the first output signal based on the comparison output signal.

8. The semiconductor device of claim 6, the audio circuitry further configured to
    generate a second output signal based on the buffer output signal, and
    output one output signal of the first output signal or the second output signal only in response to a determination that the first and second output signals are identical to each other.

9. The semiconductor device of claim 1, the audio circuitry further configured to
receive a third data, and
generate the first modulation signal based on the first, second and third data.

10. The semiconductor device of claim 1, further comprising:
a memory configured to store the second data; and
a second processor configured to cause the second data stored in the memory to be transmitted to the audio circuitry.

11. The semiconductor device of claim 10, wherein the memory is mounted on a same semiconductor chip as the second processor.

12. A semiconductor device, comprising:
a central processing unit;
a control circuitry configured to generate a first error check code of a first data; and
an audio circuitry configured to
receive the first data,
receive a second data,
generate a second error check code of the first data, and
generate a first modulation signal, based on the first and second data,
wherein the control circuitry is configured to
determine whether the first and second error check codes are identical to each other, and
control the generation of the first modulation signal based on at least the first data in response to a determination that the first and second error check codes are identical to each other.

13. The semiconductor device of claim 12, wherein the audio circuitry is configured to
generate the first modulation signal based on modulating the first data,
generate a second modulation signal based on modulating the second data, and
generate a first combined signal, based on the first and second modulation signals.

14. The semiconductor device of claim 13, wherein the audio circuitry is configured to
generate a third modulation signal based on modulating the first data,
generate a fourth modulation signal based on modulating the second data, and
cause the first combined signal to be generated only in response to a determination that the first and third modulation signals are identical to each other.

15. The semiconductor device of claim 13, wherein the audio circuitry is configured to
generate a second combined signal based on the first and second modulation signals, and
output any one signal of the first and second combined signals only in response to a determination that the first and second combined signals are identical to each other.

16. The semiconductor device of claim 13, wherein the audio circuitry is configured to
generate a third modulation signal based on modulating the first data,
generate a fourth modulation signal based on modulating the second data,
cause the first combined signal to be generated only in response to a determination that the first and third modulation signals are identical to each other;
generate a second combined signal based on the first and second modulation signals, and
output any one signal of the first and second combined signals only in response to a determination that the first and second combined signals are identical to each other.

17. The semiconductor device of claim 12, the audio circuitry further configured to
generate a third error check code of the first modulation signal;
temporarily store the first modulation signal in a buffer;
generate a fourth error check code of a buffer output signal that is output from the buffer; and
generate a first output signal based on the buffer output signal,
wherein the control circuitry is configured to control transmission of the first output signal to an external device only in response to a determination that the third and fourth error check codes are identical to each other.

18. The semiconductor device of claim 17, the audio circuitry further configured to
generate a comparison output signal that indicates whether the third and fourth error check codes are identical to each other based on comparing the third and fourth error check codes, and
selectively transmit the first output signal based on the comparison output signal.

19. The semiconductor device of claim 17, the audio circuitry further configured to
generate a second output signal based on the buffer output signal, and
output one output signal of the first output signal or the second output signal only in response to a determination that the first and second output signals are identical to each other.

20. The semiconductor device of claim 12, the audio circuitry further configured to
receive a third data, and
generate the first modulation signal based on the first, second and third data.

* * * * *